US012386651B2

(12) United States Patent
Durham et al.

(10) Patent No.: US 12,386,651 B2
(45) Date of Patent: *Aug. 12, 2025

(54) TECHNOLOGIES FOR MEMORY REPLAY PREVENTION USING COMPRESSIVE ENCRYPTION

(71) Applicant: Intel Corporation, Santa Clara, CA (US)

(72) Inventors: David M. Durham, Beaverton, OR (US); Siddhartha Chhabra, Portland, OR (US); Michael E. Kounavis, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/463,829

(22) Filed: Sep. 8, 2023

(65) Prior Publication Data

US 2024/0069955 A1 Feb. 29, 2024

Related U.S. Application Data

(63) Continuation of application No. 17/532,886, filed on Nov. 22, 2021, now Pat. No. 11,775,332, which is a
(Continued)

(51) Int. Cl.
*G06F 21/79* (2013.01)
*G06F 9/455* (2018.01)
(Continued)

(52) U.S. Cl.
CPC ...... *G06F 9/45558* (2013.01); *G06F 12/0891* (2013.01); *G06F 12/1408* (2013.01);
(Continued)

(58) Field of Classification Search
None
See application file for complete search history.

(56) References Cited

U.S. PATENT DOCUMENTS 7,827,218 B1 11/2010 Mittal
7,962,638 B2 6/2011 Cherkauer et al.
(Continued)

FOREIGN PATENT DOCUMENTS

CN 1505309 A 6/2004
CN 101166086 A 4/2008
(Continued)

OTHER PUBLICATIONS

WO2016195702. HP Enterprise Development, (Year: 2016).
(Continued)

*Primary Examiner* — Venkat Perungavoor
(74) *Attorney, Agent, or Firm* — JAFFERY WATSON HAMILTON & DESANCTIS LLP

(57) ABSTRACT

Systems and methods for memory isolation are provided. The methods include receiving a request to write a data line to a physical memory address, where the physical memory address includes a key identifier, selecting an encryption key from a key table based on the key identifier of the physical memory address, determining whether the data line is compressible, compressing the data line to generate a compressed line in response to determining that the data line is compressible, where the compressed line includes compression metadata and compressed data, adding encryption metadata to the compressed line, where the encryption metadata is indicative of the encryption key, encrypting a part of the compressed line with the encryption key to generate an encrypted line in response to adding the encryp-
(Continued)

tion metadata, and writing the encrypted line to a memory device at the physical memory address. Other embodiments are described and claimed.

20 Claims, 12 Drawing Sheets

Related U.S. Application Data continuation of application No. 16/748,176, filed on Jan. 21, 2020, now Pat. No. 11,275,603, which is a continuation of application No. 15/640,478, filed on Jul. 1, 2017, now Pat. No. 10,540,198.

(51) Int. Cl.
 *G06F 12/0891* (2016.01)
 *G06F 12/14* (2006.01)
 *G06F 21/53* (2013.01)
 *H04L 9/40* (2022.01)
 *H04L 69/04* (2022.01)

(52) U.S. Cl.
 CPC .............. *G06F 21/53* (2013.01); *G06F 21/79* (2013.01); *H04L 63/0227* (2013.01); *H04L 63/0428* (2013.01); *H04L 63/0435* (2013.01); *H04L 63/0471* (2013.01); *H04L 69/04* (2013.01); *H04L 63/123* (2013.01)

(56) References Cited

U.S. PATENT DOCUMENTS

| | | | |
|---|---|---|---|
| 8,180,741 | B2 | 5/2012 | Relyea |
| 9,159,419 | B2 | 10/2015 | Nellans et al. |
| 9,621,241 | B2 | 4/2017 | Yum |
| 9,876,637 | B2* | 1/2018 | Gauda ................ H04L 63/0428 |
| 10,185,783 | B2* | 1/2019 | Tanaka ................ G06F 16/9014 |
| 10,268,593 | B1 | 4/2019 | Olson |
| 2002/0116644 | A1 | 8/2002 | Richard |
| 2004/0107342 | A1 | 6/2004 | Pham et al. |
| 2007/0294531 | A1 | 12/2007 | Alten |
| 2008/0037777 | A1* | 2/2008 | Ignatius ................ H04L 9/0894 380/44 |
| 2009/0190760 | A1 | 7/2009 | Bojinov et al. |
| 2010/0313036 | A1 | 12/2010 | Lumb |
| 2011/0258461 | A1 | 10/2011 | Bates |
| 2012/0079174 | A1* | 3/2012 | Nellans ............. G11C 11/40615 711/E12.008 |
| 2012/0281706 | A1 | 11/2012 | Agarwal et al. |
| 2014/0040639 | A1 | 2/2014 | Raam |
| 2014/0143555 | A1 | 5/2014 | Stephenson |
| 2014/0270180 | A1 | 9/2014 | Resch |
| 2014/0325216 | A1 | 10/2014 | Lumb |
| 2015/0058587 | A1 | 2/2015 | Wang et al. |
| 2015/0293858 | A1 | 10/2015 | Raam |
| 2016/0378687 | A1 | 12/2016 | Durham et al. |
| 2017/0220256 | A1 | 8/2017 | Balasubramonian et al. |
| 2017/0220257 | A1 | 8/2017 | Balasubramonian et al. |
| 2017/0262638 | A1* | 9/2017 | Horowitz ............... G06F 16/252 |
| 2018/0074975 | A1* | 3/2018 | Deutsch ............... G06F 12/1408 |
| 2019/0007206 | A1* | 1/2019 | Surla ...................... H04L 63/10 |
| 2019/0095350 | A1* | 3/2019 | Durham ................. G06F 12/145 |

FOREIGN PATENT DOCUMENTS

| | | |
|---|---|---|
| CN | 102402488 A | 4/2012 |
| CN | 103098034 A | 5/2013 |
| CN | 104620254 A | 5/2015 |
| CN | 106062768 A | 10/2016 |
| CN | 109214219 A | 1/2019 |
| DE | 102018115267 A | 1/2019 |

OTHER PUBLICATIONS

Carrier Class High Density VoIP Media Getaway using Hardware Software Distributed Architecture. Rahmatullah (Year: 2007).
Silumtaneous Encryption and Compression of Digital Images Based on Secure-JPEG Encoding. Maqbool, Springer (Year: 2016).
CN Application No. 201810696692.6 First Office Opinion Notice mailed Dec. 28, 2024, 8 pages.
Notice of Grant of Invention Patent Right in CN Application No. 201810696692.6, mailed Jun. 2, 2025, 4 pages.

* cited by examiner

TECHNOLOGIES FOR MEMORY REPLAY PREVENTION USING COMPRESSIVE ENCRYPTION

CROSS-REFERENCE TO RELATED APPLICATION

This application is a continuation of and claims the benefit of and priority to U.S. application Ser. No. 17/532,886, entitled TECHNOLOGIES FOR MEMORY REPLAY PREVENTION USING COMPRESSIVE ENCRYPTION, by David M. Durham, et al., filed Nov. 22, 2021, now allowed, which is a continuation of and claims the benefit of and priority to U.S. application Ser. No. 16/748,176, entitled TECHNOLOGIES FOR MEMORY REPLAY PREVENTION USING COMPRESSIVE ENCRYPTION, by David M. Durham, et al., filed Jan. 21, 2020, now issued as U.S. Pat. No. 11,275,603, which is a continuation of and claims the benefit of and priority to U.S. application Ser. No. 15/640,478, entitled TECHNOLOGIES FOR MEMORY REPLAY PREVENTION USING COMPRESSIVE ENCRYPTION, by David M. Durham, et al., filed Jul. 1, 2017, now issued as U.S. Pat. No. 10,540,198, the entire contents of which are incorporated herein by reference.

BACKGROUND

Multiple virtual machines may operate in a shared environment within public cloud systems. In such shared environments, data (e.g., in the form of virtual memory) updated by one or more virtual machines (VMs) should be protected from unprivileged outside users. In addition, such memory should be protected from internal, or privileged, users. A common technique to secure one VM against another VM in the same environment is to apply VM isolation techniques by cryptographically isolating VMs from one another and from any host virtual machine manager (VMM). Memory encryption techniques that encrypt all of a VM's memory may be extended to provide encryption keys for a VM to access the memory. Despite memory encryption, a privileged entity (e.g., the VMM or another VM in the cloud environment) can modify and replay the VM's memory if the privileged entity has access to the encrypted memory. Certain additional techniques may use an additional data variable (e.g., a version number or integrity value) that is stored in a separate location, such as a table, where the data variable is checked to authenticate the VM attempting to read the memory, controlling access to the memory.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
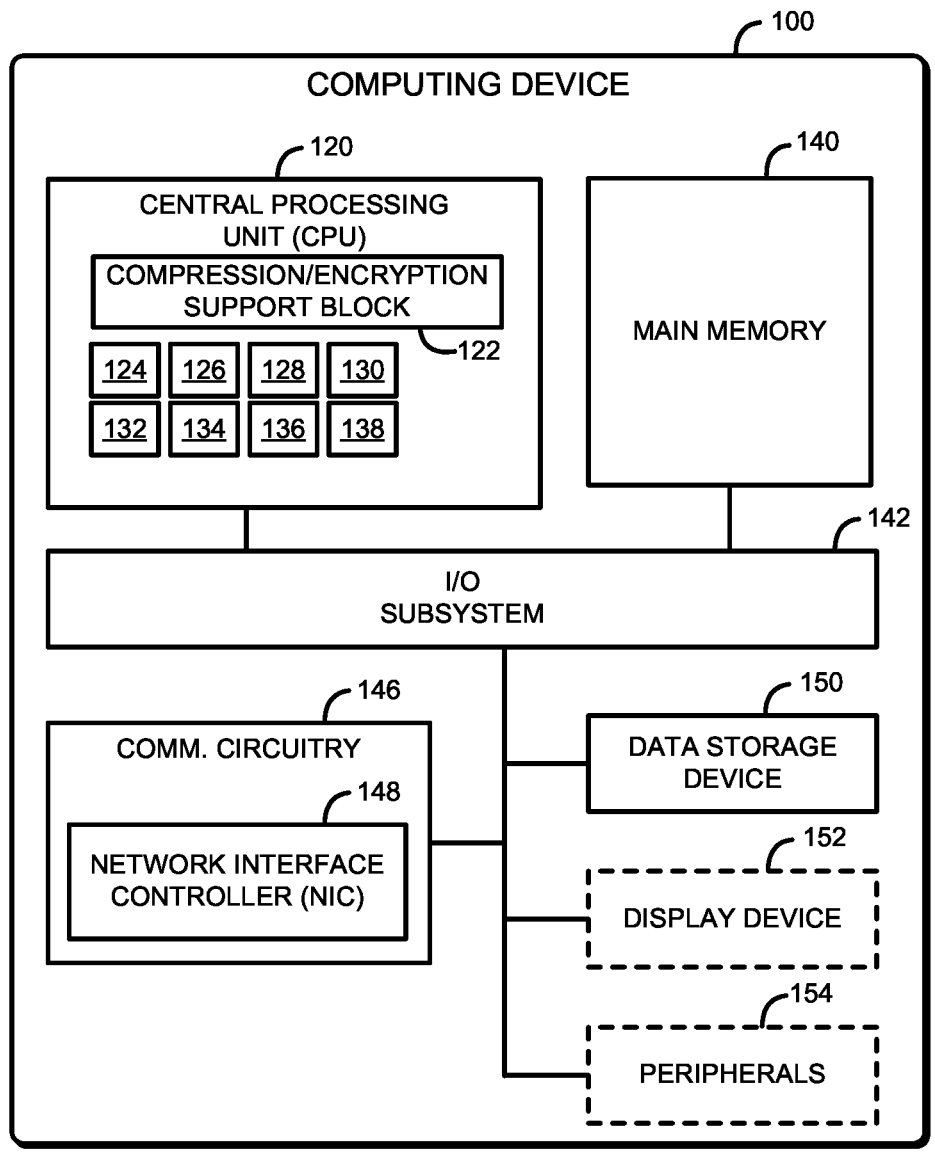
FIG. 1 is a simplified block diagram of at least one embodiment of a computing device for memory replay prevention using compressive encryption.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, an illustrative computing device 100 includes a central processing unit (CPU) 120, a main memory 140, an input/output (I/O) subsystem 142, and communication circuitry 146. Of course, in other embodiments, the computing device 100 may include other or additional components, such as those commonly found in a computer (e.g., data storage, display, etc.). Additionally, in some embodiments, one or more of the illustrative components may be incorporated in, or otherwise form a portion of, another component. For example, in some embodiments, the main memory 140, or portions thereof, may be incorporated in the CPU 120. In use, as described further below, the computing device 100 is configured to perform various methods of compressive encryption replay prevention and access control. When a virtual machine stores data to a memory resource shared by multiple virtual machines, the computing device 100 may, in embodiments of the disclosure, compress that data in addition to encrypting the data in order to prevent access and replay of the data by another virtual machine that has access to the encrypted data/memory. In addition, the computing device 100 may also manipulate the data (e.g., inserting encryption metadata, inserting compression metadata, inserting compression indicators, and/or inserting conflict indicators) in order to prevent memory access or replay by another virtual machine. Thus, the computing device 100 may provide robust memory isolation beyond encryption-only techniques. Additionally, the computing device 100 provides a memory access control and replay prevention scheme that causes no additional performance overhead as compared to encryption-only techniques.

Figure 2:
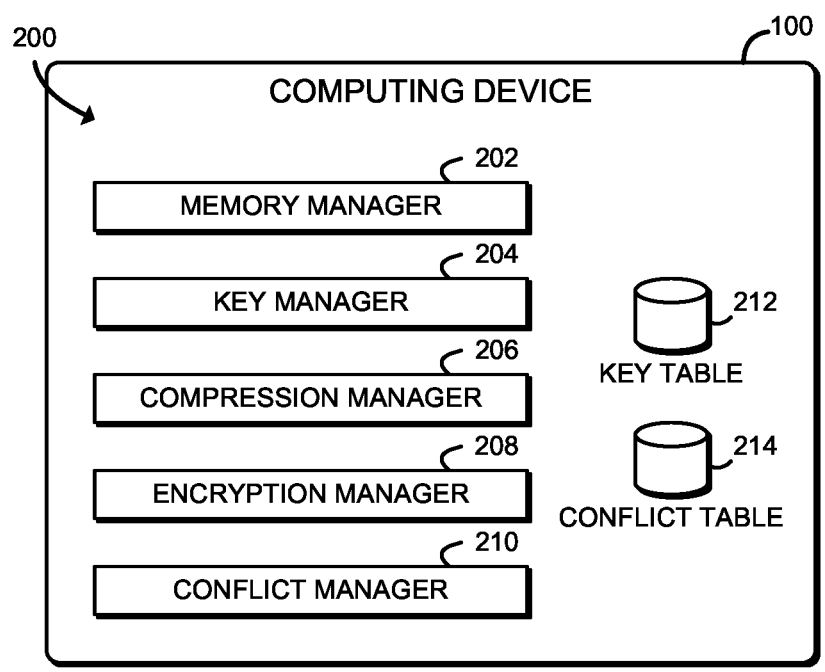
FIG. 2 is a simplified block diagram of at least one embodiment of an environment that may be established by the computing device of FIG. 1.

The CPU 120 may be embodied as any type of processor capable of performing the functions described herein. The CPU 120 may be embodied as a single or multi-core processor(s), a microcontroller, or other processor or processing/controlling circuit. The CPU 120 may include a multi-level cache, data and or instruction caches, shared caches and/or processor exclusive caches between the memory encryption engine and processors. In some embodiments, the CPU 120 may be embodied as, include, or be coupled to a field programmable gate array (FPGA), an application specific integrated circuit (ASIC), a graphics processing unit (GPU), reconfigurable hardware or hardware circuitry, or other specialized hardware to facilitate performance of the functions described herein. In the illustrative embodiment, the CPU 120 is embodied as a processor containing multiple cores 124, 126, 128, 130, 132, 134, 136, and 138. While eight cores are shown in FIG. 2, it should be understood that in other embodiments, the CPU 120 may contain a different number of cores. Similarly, the main memory 140 may be embodied as any type of volatile (e.g., dynamic random access memory (DRAM), etc.) or non-volatile memory or data storage capable of performing the functions described herein (e.g. NVRAM). In some embodiments, all or a portion of the main memory 140 may be integrated into the CPU 120. In operation, the main memory 140 may store various data and software used during operation of the computing device 100 such as packet data, operating systems, applications, programs, libraries, and drivers.

In addition, the CPU 120 also includes a compression/encryption support block 122. The compression/encryption support block 122 may be embodied as any functional block, digital logic, microcode, or other component capable of performing memory replay prevention techniques using compressive encryption as described herein. More specifically, the compression/encryption support block 122 may embodied as any component capable of performing the memory replay prevention schemes described with respect to FIGS. 3A-8B below.

The I/O subsystem 142 may be embodied as circuitry and/or components to facilitate input/output operations with the CPU 120, the main memory 140, and other components of the computing device 100. In some embodiments, the main memory 140 may be connected to the CPU 120 via a separate bus from the bus used for the I/O subsystem 142. For example, the I/O subsystem 142 may be embodied as, or otherwise include, memory controller hubs, input/output control hubs, integrated sensor hubs, firmware devices, communication links (i.e., point-to-point links, bus links, wires, cables, light guides, printed circuit board traces, etc.), and/or other components and subsystems to facilitate the input/output operations. In some embodiments, the I/O subsystem 142 may form a portion of a system-on-a-chip (SoC) and be incorporated, along with one or more of the CPU 120, the main memory 140, and other components of the computing device 100, on a single integrated circuit chip.

The communication circuitry 146 may be embodied as any communication circuit, device, or collection thereof, capable of enabling communications between the computing device 100 and other remote devices. The communication circuitry 146 may be configured to use any one or more communication technology (e.g., wired or wireless communications) and associated protocols (e.g., Ethernet, Bluetooth®, Wi-Fi®, WiMAX, etc.) to effect such communication. The illustrative communication circuitry 146 includes a network interface controller (NIC) 148, which may be embodied as one or more add-in-boards, daughtercards, network interface cards, controller chips, chipsets, or other devices that may be used by the computing device 100 to connect to other computing devices or to another computing device 100. In some embodiments, the NIC 148 may be embodied as part of a system-on-a-chip (SoC) that includes one or more processors, or included on a multichip package that also contains one or more processors. In some embodiments, the NIC 148 may include a local processor (not shown) and/or a local memory (not shown) that are both local to the NIC 148. In such embodiments, the local processor of the NIC 148 may be capable of performing one or more of the functions of the CPU 120 described herein. Additionally or alternatively, in such embodiments, the local memory of the NIC 148 may be integrated into one or more components of the computing device 100 at the board level, socket level, chip level, and/or other levels.

The computing device 100 may additionally include a data storage device 150, which may be embodied as any type of device or devices configured for short-term or long-term storage of data such as, for example, memory devices and circuits, memory cards, hard disk drives, solid-state drives, or other data storage devices. In an alternative embodiment, the systems and methods described herein may also be applied to the data storage device 150. The data storage device 150 may include a system partition that stores data and firmware code for the computing device 100. The data storage device 150 may also include an operating system partition that stores data files and executables for an operating system of the computing device 100.

Additionally, the computing device 100 may include a display 152. The display 152 may be embodied as, or otherwise use, any suitable display technology including, for example, a liquid crystal display (LCD), a light emitting diode (LED) display, a cathode ray tube (CRT) display, a plasma display, and/or other display usable in a compute device. The display may include a touchscreen sensor that uses any suitable touchscreen input technology to detect the user's tactile selection of information displayed on the display including, but not limited to, resistive touchscreen sensors, capacitive touchscreen sensors, surface acoustic wave (SAW) touchscreen sensors, infrared touchscreen sensors, optical imaging touchscreen sensors, acoustic touchscreen sensors, and/or other type of touchscreen sensors. Additionally or alternatively, the computing device 100 may include one or more peripheral devices 154. Such peripheral devices 154 may include any type of peripheral device commonly found in a compute device such as speakers, a mouse, a keyboard, and/or other input/output devices, interface devices, and/or other peripheral devices.

Referring now to FIG. 2, in an illustrative embodiment, the computing device 100 establishes an environment 200 during operation. The illustrative environment 200 includes a memory manager 202, a key manager 204, a compression manager 206, an encryption manager 208, and a conflict manager 210. The various components of the environment 200 may be embodied as hardware, firmware, software, or a combination thereof. As such, in some embodiments, one or more of the components of the environment 200 may be embodied as circuitry or collection of electrical devices (e.g., memory manager circuitry 202, key manager circuitry 204, compression manager circuitry 206, encryption manager circuitry 208, and/or conflict manager circuitry 210). It should be appreciated that, in such embodiments, one or more of the memory manager circuitry 202, the key manager circuitry 204, the compression manager circuitry 206, the encryption manager circuitry 208, and/or the conflict manager circuitry 210 may form a portion of the processor 120, the I/O subsystem 142, main memory 140, or data storage device 150 of the computing device 100. Additionally, in some embodiments, one or more of the illustrative components may form a portion of another component and/or one or more of the illustrative components may be independent of one another.

The memory manager 202 is configured to receive requests to write a data line to a physical memory address. The physical memory address includes a key identifier that is selected by the processor or hardware (e.g., associated with a virtual machine) that generates the request to write the data line. The memory manager 202 is further configured to write an encrypted line generated from the data line to the memory 140 at the physical memory address. The memory manager 202 is also configured to receive requests to read an encrypted line from a physical memory address of the computing device. The memory manager 202 is further configured to forward a data line generated from the encrypted line to the processor 120.

The key manager 204 is configured to select an appropriate encryption key from a key table 212 based on the key identifier of the physical memory address. The same encryption key may be used for both encryption and decryption operations. In some embodiments, the key manager 204 may be configured to select a decryption key from the key table 212 based on the start of the encrypted line in response to determining that the start of the encrypted line does not match a conflict indicator, as described below.

The compression manager 206 is configured to determine whether the data line is compressible in response to a write request and, if so, compress the data line to generate a compressed line. The compressed line includes compression metadata and compressed data. In some embodiments, the compression manager 206 may be further configured to add a compression indicator to the compressed line. The compression indicator includes a predetermined bit pattern. In those embodiments, the compression manager 206 may be configured to determine, in response to a read request, whether a start of the encrypted line matches the compression indicator. In those embodiments, the compression manager 206 is further configured to decompress the compressed data to generate the data line in response to determining that encryption metadata of the compressed line is verified. Additionally or alternatively, in some embodiments the compression manager 206 may be configured to decompress the compressed data to generate the data line in response to a determination that integrity metadata of the compressed line is verified against the compressed data.

The encryption manager 208 is configured to add, in response to a write request, encryption metadata to the compressed line. The encryption metadata is indicative of the encryption key. The encryption manager 208 is further configured to encrypt a part of the compressed line with the encryption key to generate an encrypted line in response to addition of the encryption metadata. In some embodiments, the encryption manager 208 may be further configured to decrypt, in response to a read request, a part of the encrypted line with the decryption key to generate a compressed line in response to determining that the start of the encrypted line matches the compression indicator. The compressed line may include compression metadata, encryption metadata, and compressed data. The encryption manager 208 may be further configured to determine whether the encryption metadata is verified against the decryption key. The encryption manager 208 may be further configured to generate a verification error in response to determining that the encryption metadata is not verified.

Additionally or alternatively, in some embodiments the encryption manager 208 may be further configured to add integrity metadata to the compressed line. In those embodiments, the integrity metadata may include an integrity check value based on the compressed data and the encryption metadata may include the key identifier. The integrity check value may also be calculated based on other data, such as the compressed data and the compression metadata and/or the uncompressed data line. In those embodiments, the compression metadata, the integrity metadata, and the compressed data may be encrypted. The encryption manager 208 may be further configured to decrypt, in response to a read request, a part of the encrypted line with the decryption key to generate the compressed line. The compressed line comprises compression metadata, integrity metadata, and compressed data. The encryption manager 208 is further configured to determine whether the integrity metadata is verified against the compressed data. The encryption manager 208 may be further configured to determine whether the start of the encrypted line matches the key identifier of the physical memory address if the integrity metadata is verified against the compressed data, and to generate a verification error if the start of the encrypted line does not match the key identifier of the physical memory address.

The conflict manager 210 may be configured to, in response to a write request, encrypt the data line with the encryption key to generate the encrypted line if the data line is not compressible and determine whether a start of the encrypted line matches the compression indicator or a conflict indicator. The conflict indicator may include a predetermined bit pattern that is different from the compression indicator. The conflict manager 210 is may be further configured to update an entry of a conflict table 214 that corresponds to the physical memory address based on the start of the encrypted line if the start of the encrypted line matches the compression indicator or the conflict indicator. The conflict table 214 may also be stored at the main memory 140. The conflict manager 210 may be configured to replace the start of the encrypted line with the conflict indicator if the start of the encrypted line matches the compression indicator or the conflict indicator. In response to a read request, the conflict manager 210 may be configured to determine whether the start of the encrypted line matches the conflict indicator if the start of the encrypted line does not match the compression indicator and to replace the start of the encrypted line with the compression indicator based on a value from a conflict table that corresponds to the physical memory address of the encrypted line if the start of the encrypted line matches the conflict indicator. The conflict manager 210 may be further configured to decrypt the entire encrypted line with the decryption key to generate the data line.

Additionally or alternatively, in some embodiments, the conflict manager 210 may be configured to, in response to a write request, encrypt the data line with the encryption key to generate the encrypted line if the data line is not compressible, select a test encryption key from the key table 212 based on a start of the encrypted line, and decrypt a remaining part of the encrypted line with the test encryption key to generate a test compressed line. The test compressed line includes test compression metadata, test integrity metadata, and test compressed data. The conflict manager 210 may be further configured to determine whether the test integrity metadata is valid based on the test compressed data, update an entry of the conflict table 214 that corresponds to the physical memory address with the start of the encrypted line if the test integrity metadata is valid, and replace the start of the encrypted line with a conflict indicator if the test integrity metadata is valid.

In some embodiments, the conflict manager 210 may be configured to, in response to a read request, determine whether a start of the encrypted line matches a conflict indicator, replace the start of the encrypted line with a value from the conflict table 214 that corresponds to the physical memory address of the encrypted line if the start of the encrypted line matches the conflict indicator, select a decryption key from the key table 212 based on the key identifier of the physical memory address if the integrity metadata is not verified against the compressed data, and decrypt the entire encrypted line with the decryption key to generate the data line.

Figure 3A:
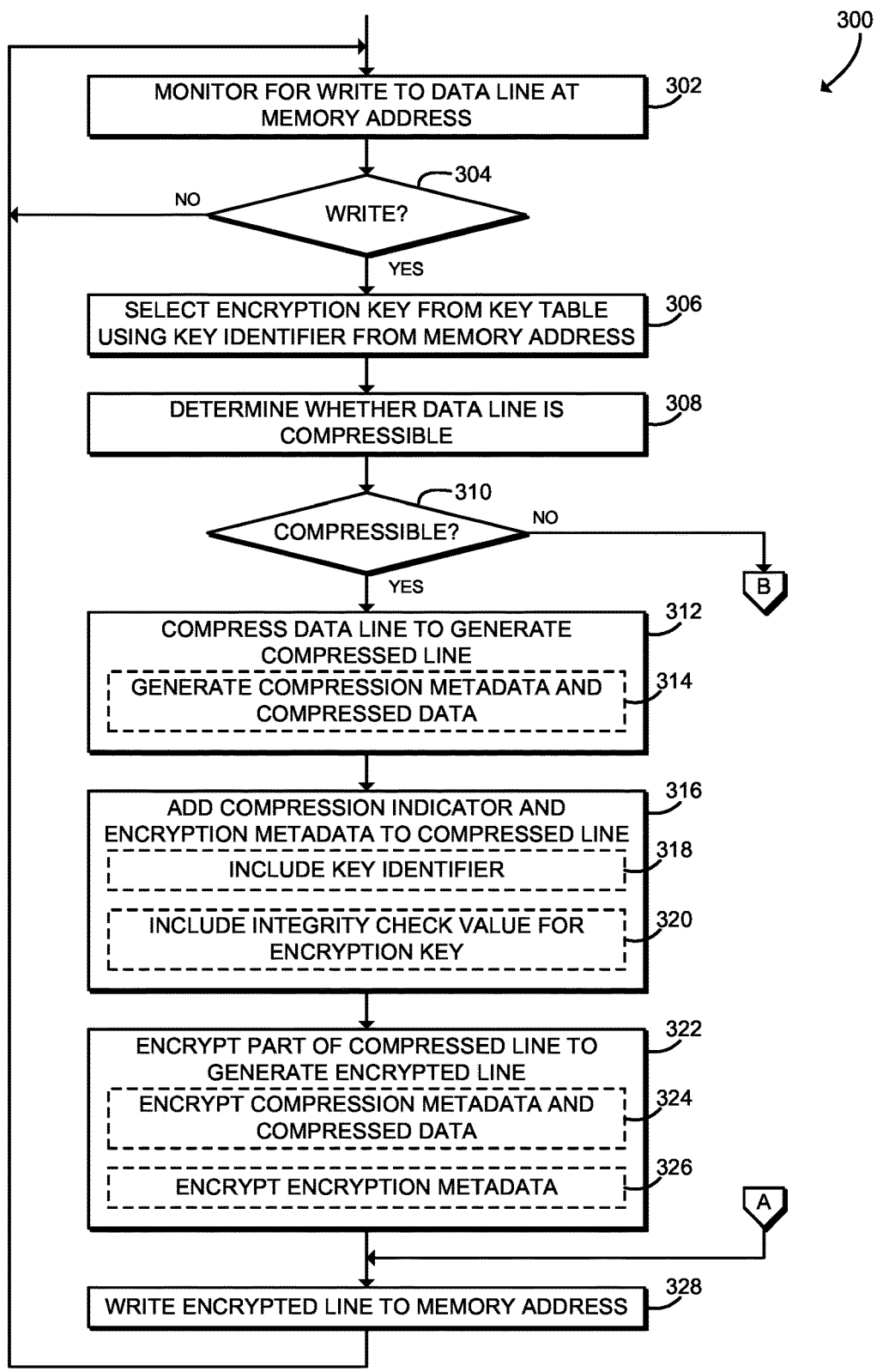
FIGS. 3A and 3B are a simplified flow diagram of at least one embodiment of a method for memory replay prevention using compressive encryption that may be performed by the computing device of FIGS. 1 and 2 to write a data line to memory.
Figure 3B:
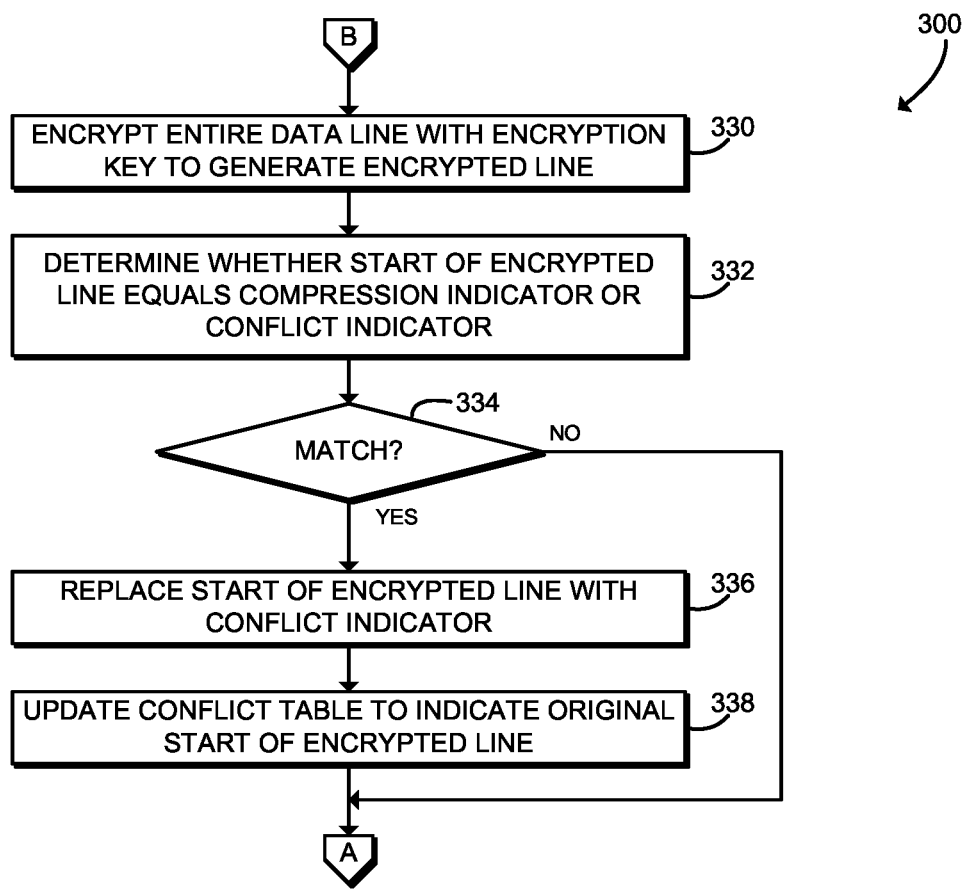

Referring to FIG. 3A, in use, the computing device 100 may execute a method 300 for writing a data line using compressive encryption replay prevention. In the illustrative embodiment, FIGS. 3A and 3B depict a method that embeds a compression indicator in the compressed and encrypted data line. The method 300 begins with block 302, in which the computing device 100 monitors for any requests to write a data line to memory. A write request may be generated, for example, by a core of the processor 120 in response to executing a store instruction and/or by a caching subsystem of the processor 120. In the illustrative embodiment, the method 300 advances to block 304, in which the computing device 100 determines whether a write request has been detected. If not, the method 300 loops back to block 302 to continue monitoring for write requests. If a write request is detected, the method 300 advances to block 306.

In block 306, the computing device 100 selects an encryption key from a key table. In one embodiment, the encryption key is selected based on a key identifier that is included in a memory address supplied with the write request. In another embodiment, the key identifier may be defined using additional metadata that is accessible from the cache. The memory address identifies a memory location at which the data line is requested to be written. The key identifier may be embodied as one or more bits of the memory address that are reserved or otherwise not used to identify the memory location. For example, in some embodiments the memory address may be embodied as a 64-bit value, but only the lower 48 bits may be used to identify the memory location. In that embodiment, part of the upper 16 bits (e.g., three bits) may be used as the key identifier. The key identifier may be used to index a key table in memory to select the encryption key. In the illustrative embodiment, the key table is also encrypted with a key table encryption key that is known only to the central processing unit 120. Accordingly, the key table is decrypted using a key table decryption key when a key from the key table is to be accessed. Additionally or alternatively, the key table may be stored on-die, on-package, or otherwise stored so that the encryption keys are not exposed to software. The key identifier, also known as color bits, tag bits, or a protection key, may be configured by privileged software of the computing device 100 and thus may be used to partition memory within an unprivileged process such as a virtual machine or application. The computing device 100, in an alternative embodiment, may set the key identifier in memory addresses when the virtual machine that owns the associated encryption key is in operation.

The method 300 advances to block 308, in which the computing device 100 determines whether the data line is compressible. The computing device 100 may use any compression algorithm or other technique to determine whether the data line is compressible. For example, the computing device 100 may determine whether the data line includes any repeated words (e.g., 16-bit values) or other repeated data. In block 310, the computing device 100 checks whether the data line is compressible. If not, the method 300 branches to block 330, shown in FIG. 3B and described below. If the data line is compressible, the method 300 advances to block 312, in which the computing device 100 compresses the data line to generate a compressed line. In the illustrative embodiment, any commonly available lossless compression algorithm may be used to compress the data line. In some embodiments, in block 314 the computing device 100, as part of the compression process, generates the compressed line and also generates compression metadata. In one embodiment, the compression metadata may include a 5-bit value indicating the location of the first repeating 16-bit word and a 4-bit value indicating the distance from the first repeating word to the second repeating word, where the distance may wrap to the beginning of the data line. In that embodiment, by removing the repeated word, the compressed data may be 16 bits shorter than the original, uncompressed data line. In a related embodiment, the computing device 100 may be configured to identify additional repeating words in order to free additional space for additional metadata. For example, an additional 4-bit value would identify a location of a third repeating word, and a 3-bit value would identify a distance to a fourth repeating word and so on.

The method 300 advances to block 316, in which the computing device 100 adds a compression indicator and encryption metadata to the compressed line. The compression indicator may be embodied as a predetermined binary value, such as a four-bit binary value corresponding to the hexadecimal value 'xC.' In some embodiments, in block 318, the encryption metadata includes the key identifier. For example, the three-bit key identifier value from the memory address may be added to the compressed line. In some embodiments, in block 320 the encryption metadata includes an integrity check value based on the encryption key. For example, the integrity check value may be generated as a hash, a secure hash function (e.g. SHA3) or as a part of a hash of the data. The compressed line, including the compression indicator, the encryption metadata, the compression metadata, and the compressed data, has the same length as the original, uncompressed data line (e.g., 512 bits).

The method advances to block 322, in which the computing device 100 encrypts part of the compressed line (e.g., using techniques such as ciphertext stealing) with the encryption key to generate an encrypted line. The computing device 100 may leave parts of the compressed line that include metadata in the clear. More specifically, at block 324, in some embodiments the computing device 100 may encrypt the compression metadata and the compressed data of the compressed line. In those embodiments, the computing device 100 may leave the compression indicator and the encryption metadata (e.g., the key identifier or the integrity check value) in the clear. Additionally or alternatively, at block 326, the computing device 100 may also encrypt the encryption metadata. In those embodiments, the compression indicator may remain in the clear. Note that when combining compression with encryption, compression is performed before encryption when data is being written to memory, and decompression occurs after decryption when data is being read from memory. This is because encryption will produce a pseudo-random sequence of ciphertext bits that is unlikely to compress after encryption.

In some embodiments, ciphertext stealing techniques may be used for additional security. For example, a block cipher, (e.g., a cipher such as AES in ECB or XTS mode that operates on a 128-bit block size), may overlap the last encryption block with the cipher text of the first encryption block (e.g., the block containing the compression metadata, after it was encrypted as part of the first encryption block), double-encrypting a portion of the first encryption block as part of the last encryption block to accommodate the unencrypted compression indicator value and/or encryption metadata (e.g., key identifier). Then, on a memory read operation, an encrypted compressed block will be decrypted by decrypting the last encryption block overlapping with a portion of the first encryption block, followed by decrypting the third encryption block, second encryption block and then finally the first encryption block including the decrypted overlapping portion with the first block (decrypting the four 128-bit blocks in reverse order). This technique also prevents replay of data since using the wrong encryption key to decrypt the compressed data will cause data corruption on the memory read attempt and then produce non-compressible data on subsequent memory write operation, destroying the original data in memory and preventing its replay when reading it again using the original (correct) encryption key. The encryption metadata (e.g., key identifier) may also indicate that the wrong physical address bits were used to access the compressed line because its key identifier does not match the physical address bits. Thus, verifying that the key identifier in the memory read address and the key identifier in the encryption metadata are the same value provides an access control mechanism preventing the wrong entity (e.g. VM or application) from reading memory that does not belong to it. An error may then be indicated to the processor 120, security subsystem, and/or software.

After encrypting the data line, the method 300 advances to block 328, in which the computing device 100 writes the encrypted line to the destination memory address specified by the write request. After writing the encrypted line to memory, the method 300 loops back to block 302 to continue monitoring for write requests.

Referring back to block 310, if the data line is not compressible, the method 300 branches to block 330, shown in FIG. 3B. Referring now to FIG. 3B, in block 330, the computing device 100 encrypts the entire data line (which is uncompressed) with the encryption key to generate an encrypted line. At block 332, the computing device 100 determines whether a start of the encrypted line equals the compression indicator or a conflict indicator. As described above, the compression indicator may be embodied as a predetermined binary value such as the four-bit value corresponding to hexadecimal 'xC.' Similarly, the conflict indicator may be embodied as a different predetermined binary value such as the four-bit value corresponding to hexadecimal 'xD.' Thus, in the illustrative embodiment the computing device 100 may determine whether the first four bits of the encrypted line equal 'xC' or 'xD.' In block 334, the computing device 100 checks whether the start of the encrypted line matches the compression indicator or the conflict indicator. If not, the method 300 branches to block 328, shown in FIG. 3A, to write the encrypted line to memory. If the start of the encrypted line matches the compression indicator or the conflict indicator, the method 300 advances to block 336.

In block 336, the computing device 100 replaces the start of the encrypted line with the conflict indicator (e.g., 'xD'). Of course, if the encrypted line already starts with the conflict indicator, then the computing device 100 may not alter the encrypted line. In block 338, the computing device 100 updates the conflict table 208 to indicate the original value of the start of the encrypted line (e.g., 'xC' or 'xD'). The conflict table 208 may include a table entry for every possible memory address that corresponds to a data line (similar to a memory page table). Each conflict table 208 entry may include a Boolean value or other value that indicates whether the encrypted line originally started with 'xC' or 'xD.' As described further below in connection with FIGS. 5A and 5B, the conflict table 208 entry may be used to decrypt the encrypted line on read. After updating the conflict table, the method 300 branches to block 328, shown in FIG. 3A, to write the encrypted line to memory. Some embodiments may reduce the compression indicator to just one bit (e.g. 1b indicates compressed and 0b indicates not compressed), in which case the conflict table 208 will always be consulted in the 0b (not-compressible) condition to determine the value of the original bit. In such embodiments, the conflict table 208 may also include metadata such as the key identifier and/or the integrity check value, allowing access control on non-compressible lines by verifying that the key identifier in the address matches the key identifier assigned to the line in the conflict table 208, or integrity check value, or else report an error.

Figure 4:
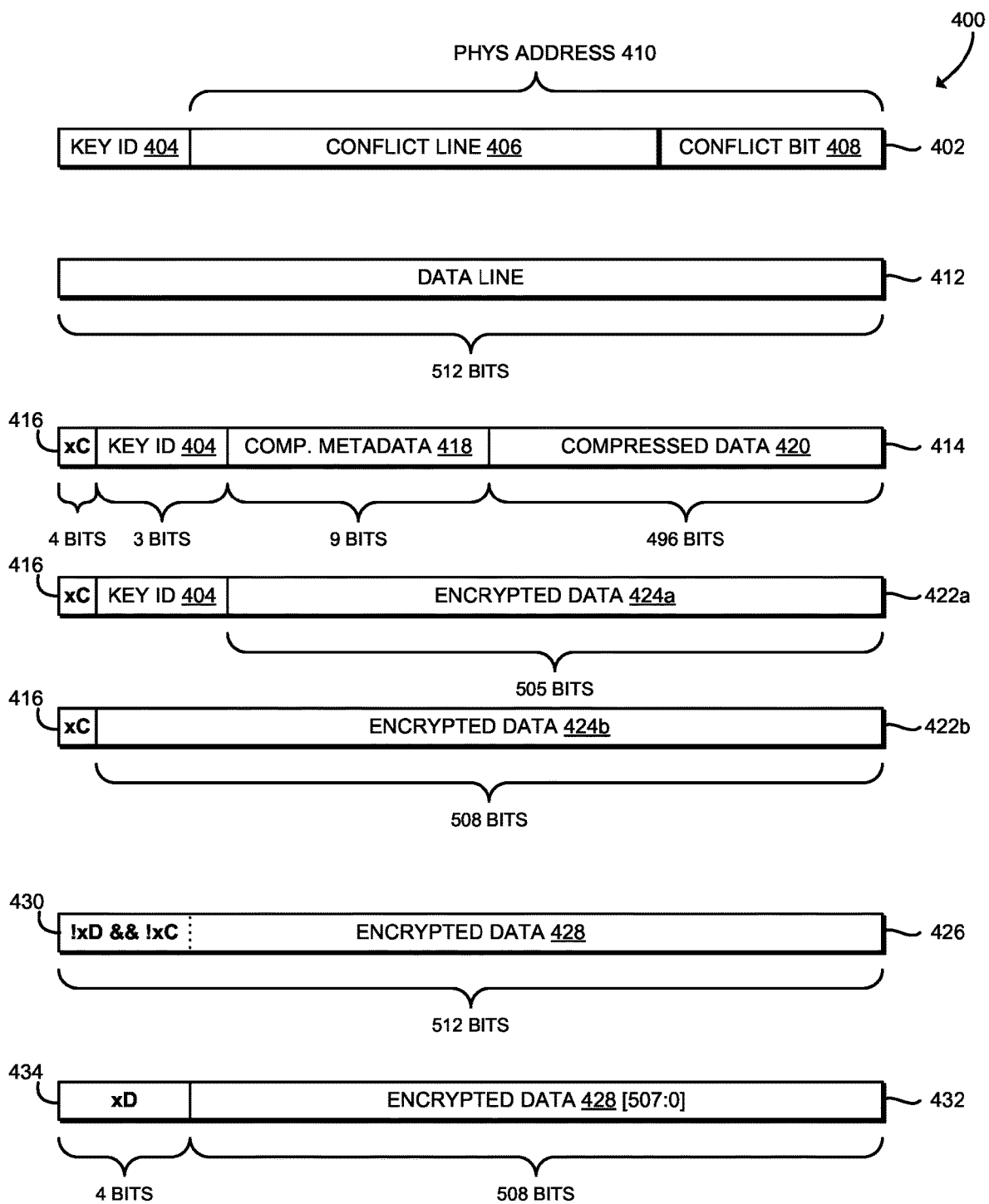
FIG. 4 is a schematic diagram illustrating various memory states that may be generated by the computing device of FIGS. 1 and 2.

Referring to FIG. 4, a block diagram 400 illustrates a variety of memory states generated as a result of the replay prevention scheme as disclosed herein. Memory address 402 shows a physical address 410 adjacent to a key identifier 404. Key identifier 404 may also be referred to as a color, memory tag, or protection key. The physical address 410 identifies a memory location at which to read or write a data line. As shown, the physical address 410 includes an identifier (e.g., a pointer) to the conflict line 406 and a conflict bit 408. The conflict line 406 and the conflict bit 408 may be used to index the conflict table 208 as described above in connection with block 338 of FIG. 3B.

Memory block 412 shows a data line of 512 bits. In the illustrative embodiment, the encryption and compression processes described herein are applied to a memory block of 512 bits such as memory block 412. Memory block 414 shows a compressed line that includes the compression indicator 416 (equal to 'xC'), the key identifier 404, compression metadata 418, and compressed data 420. Any publicly available compression algorithm may be used to compress the data line to generate the compressed data 420. Compression metadata used or required by the algorithm is stored as compression metadata 418.

Memory block 422a shows one potential embodiment of the memory block 414 after encryption. In the illustrative embodiment, only part of memory block 414 is encrypted. For example, as shown in memory block 422a, only the compression metadata 418 and the compressed data 420 are encrypted to generate encrypted data 424a. The key identifier 404 remains unencrypted. Similarly, the compression indicator 416 is also unencrypted.

Memory block 422b shows another potential embodiment of the memory block 414 after encryption. Memory block 422b now includes encrypted data 424b and compression indicator 416. In the embodiment illustrated here, the entirety of the memory block 414 is encrypted, except for the compression indicator 416, (i.e., the key identifier 404, the compression metadata 418, and the compressed data 420 are encrypted).

Memory block 426 shows an uncompressible memory block 412 after encryption. The memory block 426 includes encrypted data 428, which is generated by encrypting the entire memory block 412. As shown, the encrypted data 428 includes a starting part 430, which is illustratively four bits. The starting part 430 of the memory block 426 may be any value that is not equal to the compression indicator or the conflict indicator (e.g., not equal to either 'xC' or 'xD'). Similarly, memory block 432 shows an uncompressible memory block 412 after encryption. The memory block 432 also includes encrypted data 428, which is generated by encrypting the entire memory block 412. However, the start 434 of the encrypted line 432 equals the compression indicator or the conflict indicator and is thus replaced with the conflict indicator 'xD.' Thus, the illustrative memory block 432 includes only the last 508 bits of the encrypted data 428. As described above, the original start of the encrypted line 432 is stored or otherwise indicated in the conflict table 208.

Figure 5A:
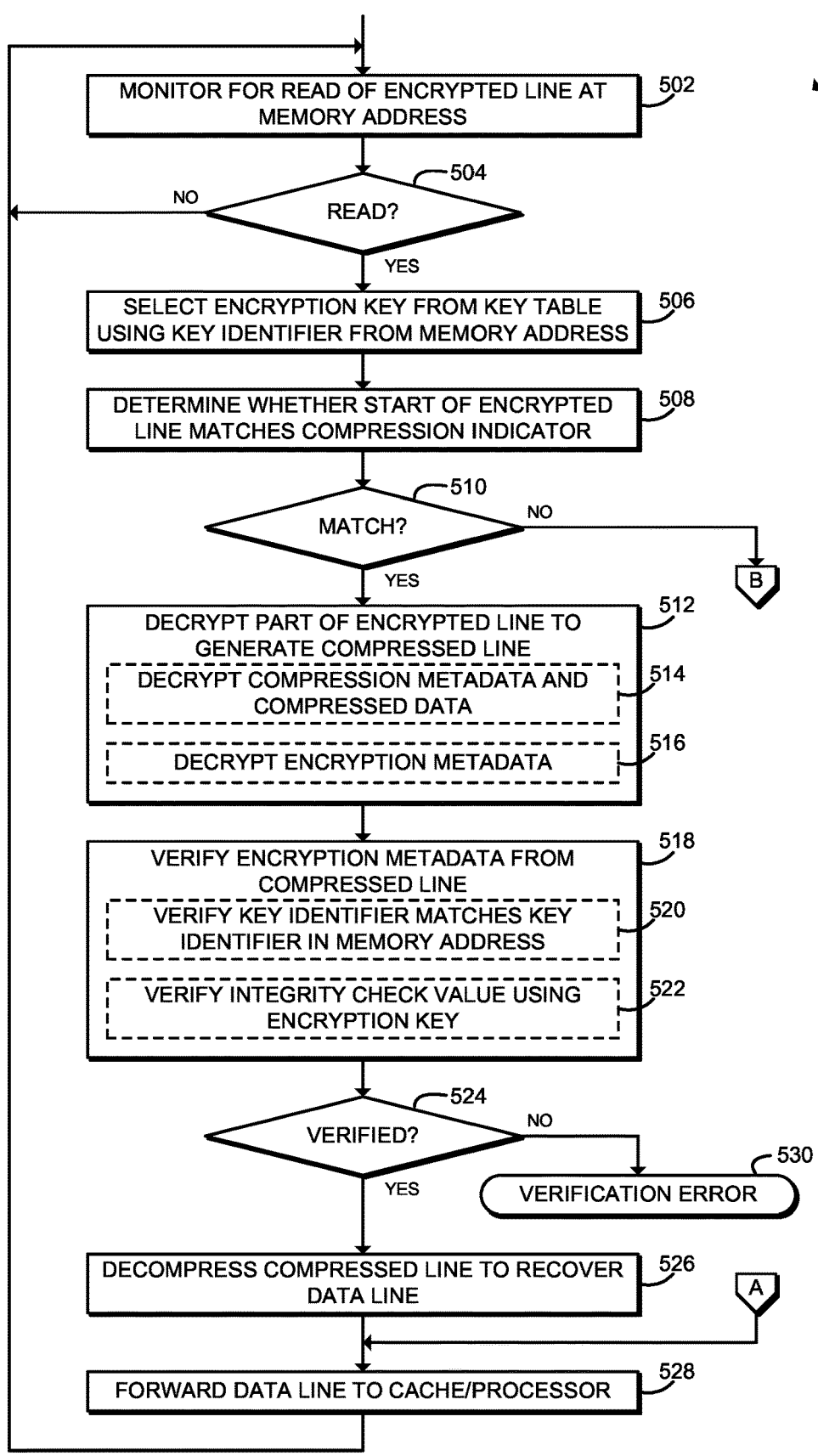
FIGS. 5A and 5B are a simplified flow diagram of at least one embodiment of a method for memory replay prevention using compressive encryption that may be performed by the computing device of FIGS. 1 and 2 to read a data line from memory.

Referring to FIG. 5A, in use, the computing device 100 may execute a method 500 for reading a data line that has been written using compressive replay prevention. The method 500 begins at block 502, in which the computing device 100 monitors for read requests. A read request may be generated, for example, by a core of the processor 120 in response to executing a load instruction and/or by a caching subsystem of the processor 120. The read request identifies the physical address of the data line, also referred to herein as the source physical address. In block 504, the computing device 100 determines whether a read has been requested. If not, the method 500 loops back to block 502 to continue monitoring for reads. If a read has been requested, the method 500 advances to block 506.

In block 506, the computing device 100 selects an encryption key from a key table using a key identifier retrieved from the requested memory address. As described above, the key identifier may be embodied as one or more bits of the memory address that are reserved or otherwise not used to identify the memory location. The key identifier (e.g., a three-bit value) may be used to index a key table in memory to select the encryption key.

The method 500 advances to block 508, where the computing device 100 retrieves the encrypted line from the memory 140 at the requested memory address. The computing device 100 determines whether the start of the encrypted line matches a compression indicator. As described above, the compression indicator may be embodied as a predetermined binary value, such as a four-bit binary value corresponding to the hexadecimal value 'xC.' In block 510, the computing device 100 checks whether the start of the encrypted line matches the compression indicator. If not, the method 500 branches to block 532, shown in FIG. 5B and described below. If there is a match between the start of the encrypted line and the compression indicator, the method 500 advances to block 512.

In block 512, computing device 100 decrypts the encrypted line with the encryption key to generate the compressed line. The computing device 100 may not decrypt parts of the encrypted line that are in the clear. More specifically, in some embodiments the computing device 100 may decrypt the compressed data and the compression metadata at block 514 that was generated as part of the compression process. In those embodiments, the encryption metadata may have been included as plaintext in the encrypted line. In some embodiments, the computing device 100 may also decrypt the encryption metadata at block 516.

After decryption, the method 500 advances to block 518, in which the computing device 100 verifies the encryption metadata that is associated with the compressed line. More specifically, the computing device 100 verifies that the key identifier or integrity check value that was stored with the compressed line matches the encryption key selected using the key identifier of the memory address. At write time, the key identifier of the memory address used to write the data line is associated with the virtual machine or other protection domain that stored the data. Consequently, the stored key identifier or integrity check value is associated with the virtual machine or other protection domain that requested the write. In some embodiments, in block 522 the computing device 100 may compare the stored key identifier in the compressed line with the key identifier in the memory address, which corresponds to the key identifier of the virtual machine requesting to read the compressed line. In some embodiments, in block 524 the computing device 100 may compare the stored integrity check value of the compressed line to an integrity check value generated based on the uncompressed data line or the compressed line. As described above with respect to FIGS. 3A and 3B, the integrity check value may be a value generated using the encryption key but not the key identifier itself. For example, the integrity check value may be a cyclic redundancy value or a hash of the encryption key calculated using a hashing algorithm.

At block 524, the computing device 100 determines whether the encryption metadata was successfully verified. If the encryption metadata was not verified, the method 500 branches to block 530, in which the computing device 100 generates a verification error, for example by sending a poison bit, error bit, interrupt, or error message to the central processing unit 120. More specifically, the compression/ encryption support block may transmit a poison bit to the central processing unit 120 to indicate that a memory read attempt failed, possibly due to an unauthorized memory replay attempt. The central processing unit 120 may be configured to notify an operator, log the memory reply attempt, or take cautionary measures to identify the unauthorized virtual machine and prevent further attempts. After generating the error, the method 500 is completed, for example by aborting the memory read request.

Referring back to block 524, if the encryption metadata is successfully verified, the method 500 advances to block 526, in which the computing device 100 decompresses the compressed line to recover the data line in uncompressed form. In a related embodiment, the computing device 100 will decompress the compressed line to recover the data line, then verify the integrity check value before proceeding. The method 500 continues to block 528 in which the computing device 100 forwards the uncompressed data line to the cache and/or processor 120 (which in turn provides access to the virtual machine that requested the data line). After forwarding the data line, the method 500 loops back to block 502 to continue monitoring for additional read requests.

Figure 5B:
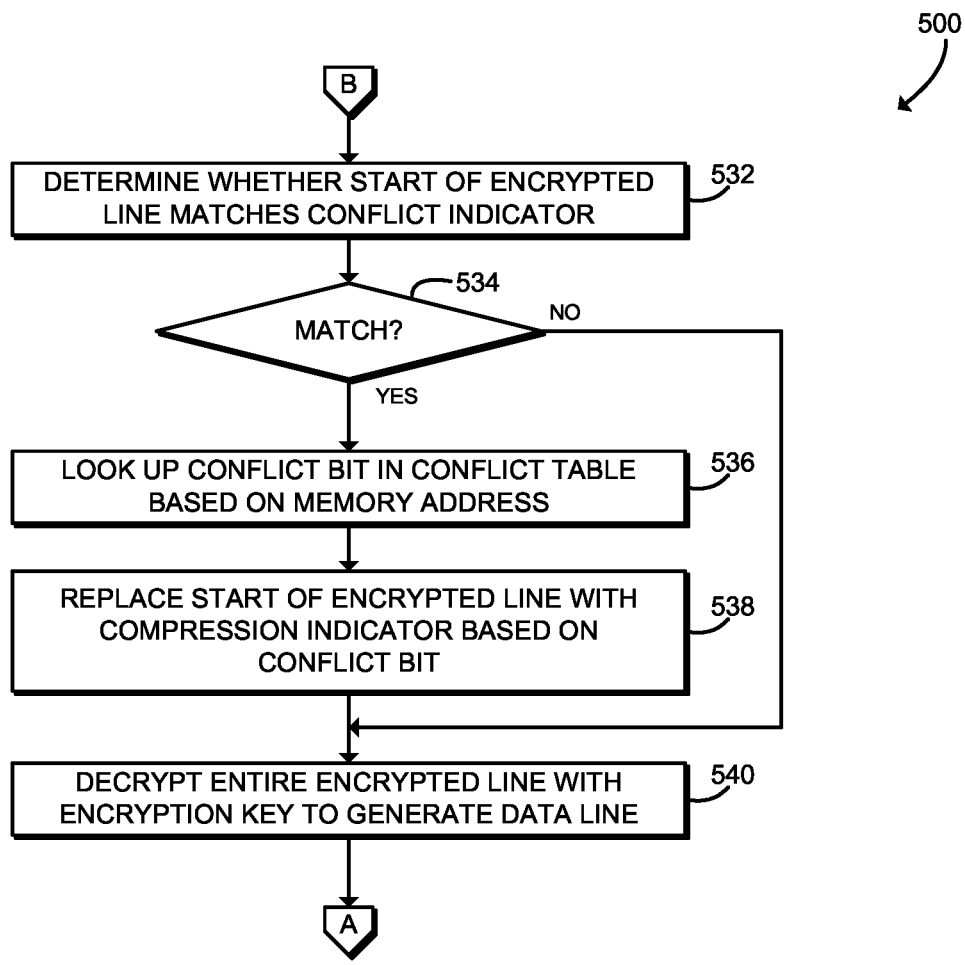

Referring back to block 510, if there is not a match between the start of the encrypted line and the compression indicator, then the method 500 branches to block 532, shown in FIG. 5B. As described above in connection with FIGS. 3A and 3B, if the encrypted line does not start with the compression indicator, then the data line was not compressed before being encrypted and stored. Referring now to FIG. 5B, in block 532 the computing device 100 determines whether the start of the encrypted line matches a conflict indicator. As described above, the conflict indicator may be embodied as a predetermined binary value that is different from the conflict indicator, such as the four-bit value corresponding to hexadecimal 'xD.' In block 534, the computing device 100 checks whether the start of the encrypted line matches the conflict indicator. If not, the method 500 skips ahead to block 540, described below. If a match is found at block 534, the method 500 advances to block 536.

In block 536, the computing device 100 looks up a conflict bit in the conflict table 208, based on the memory address of the requested data line. For example, the computing device 100 may use part of the physical memory address to index a conflict line within the conflict table 208, and the remaining part of the memory address to index a conflict bit within the conflict line. Based on the conflict bit, the computing device 100 replaces the start of the encrypted line with a compression indicator at block 538. For example, if the conflict bit is set, the computing device 100 may replace the start of the encrypted line with 'xC,' and if the conflict bit is not set, the computing device 100 may not change the start of the encrypted line. The method then advances to block 540, in which the computing device 100 decrypts the entire encrypted line with the encryption key to generate the data line. After decryption, the method 500 branches to block 528, shown in FIG. 5A, to forward the data line to the cache.

Figure 6A:
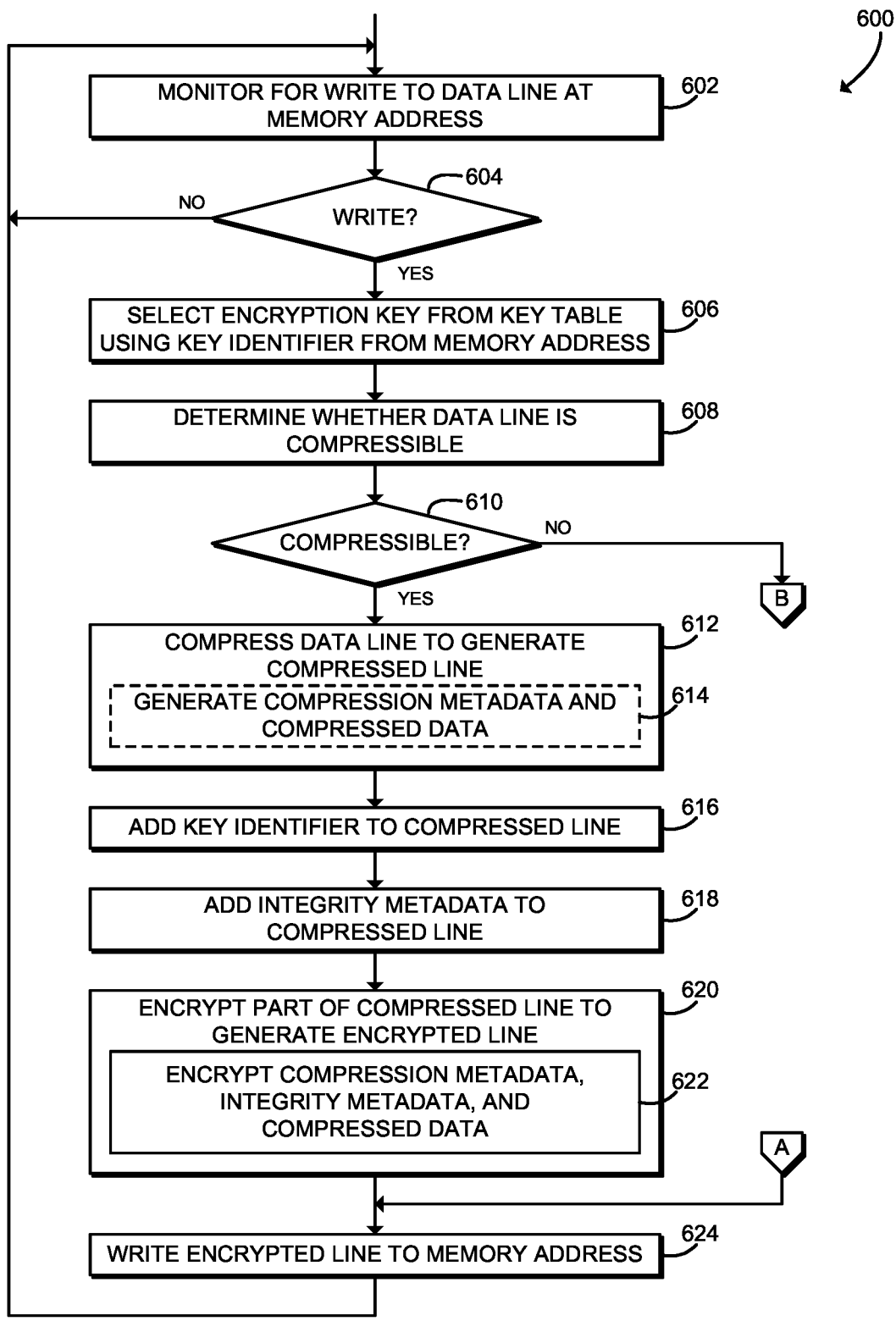
FIGS. 6A and 6B are a simplified flow diagram of at least one embodiment of a method for memory replay prevention using compressive encryption that may be performed by the computing device of FIGS. 1 and 2 to write a data line to memory.
Figure 6B:
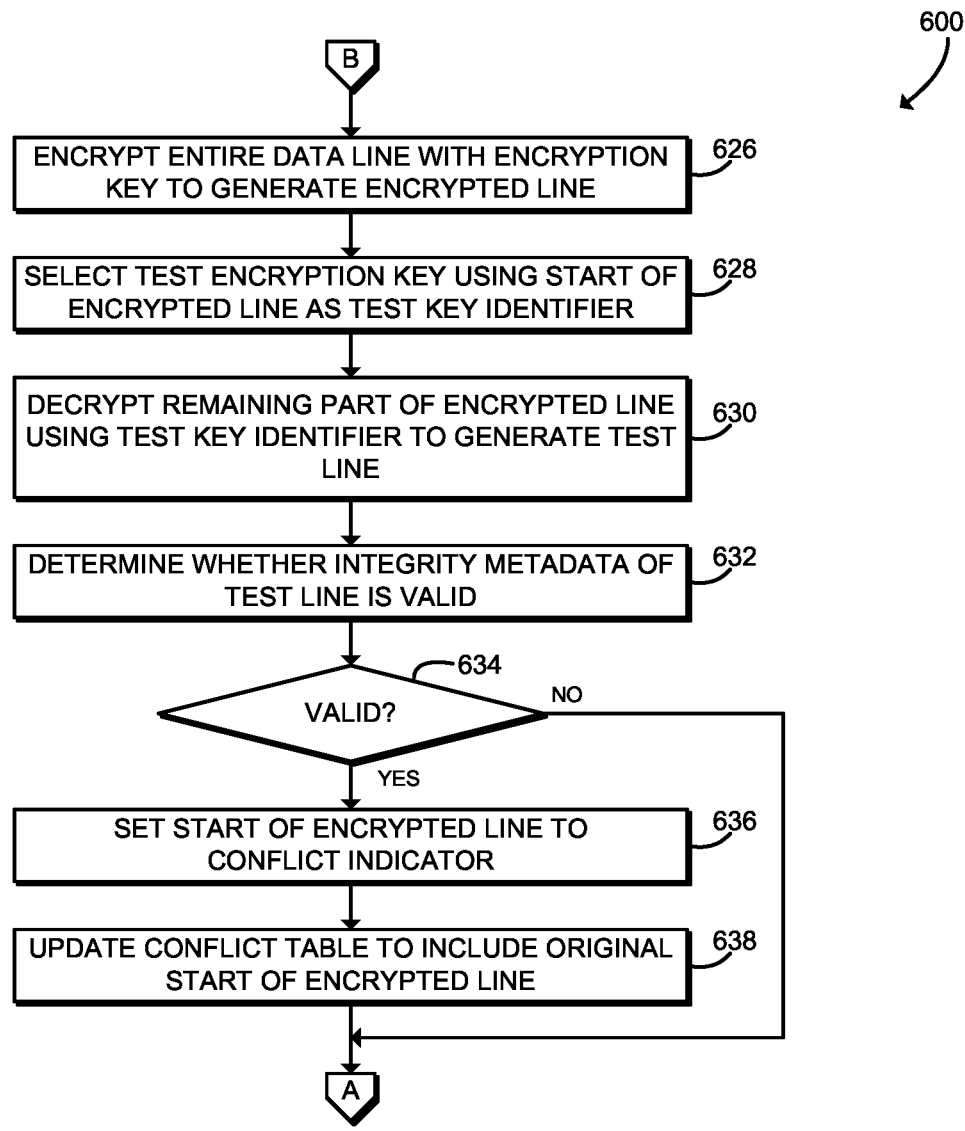

Referring to FIG. 6A, in use, the computing device 100 may execute a method 600 for writing a data line using compressive replay prevention. In the illustrative embodiment, FIGS. 6A and 6B depict a method that uses an integrity metadata value generated from the compressed line instead of a predetermined compression indicator. The method 600 begins with block 602, in which the computing device 100 monitors for any requests to write a data line to memory. As described above, a write request may be generated, for example, by a core of the processor 120 in response to executing a store instruction and/or by a caching subsystem of the processor 120. In the illustrative embodiment, the method advances to block 604, in which the computing device 100 determines whether a write request has been detected. If not, the method 600 loops back to block 602 to continue monitoring for write requests. If a write request is detected, the method 600 advances to block 606.

In block 606, the computing device 100 selects an encryption key from a key table. More specifically, the encryption key is selected based on a key identifier that is included in a memory address supplied with the write request. The memory address identifies a memory location at which the data line is requested to be written. As described above, the key identifier may be embodied as one or more bits of the memory address that are reserved or otherwise not used to identify the memory location. The key identifier may be used to index a key table in memory to select the encryption key.

The method 600 advances to block 608, in which the computing device 100 determines whether the data line is compressible. As described above, the computing device 100 may use any compression algorithm or other technique to determine whether the data line is compressible. For example, the computing device 100 may determine whether the data line includes any repeated words (e.g., 16-bit values) or other repeated data. In block 610, the computing device 100 checks whether the data line is compressible. If not, the method 600 branches to block 626, shown in FIG. 6B and described below. If the data line is compressible, the method 600 advances to block 612, in which the computing device 100 compresses the data line to generate a compressed line. In the illustrative embodiment, any commonly available compression algorithm may be used to compress the data line. In some embodiments, in block 614 the computing device 100, as part of the compression process, generates the compressed line and also generates compression metadata. As described above, in one embodiment, the compression metadata may include a 5-bit value indicating the location of the first repeating 16-bit word and a 4-bit value indicating the distance from the first repeating word to the second repeating word, where the distance may wrap to the beginning of the data line.

The method 600 then advances to block 616, in which the computing device 100 adds the key identifier to the compressed line. As described above, the key identifier may be embodied as a three-bit value copied from the memory address. At block 618, the computing device 100 also adds integrity metadata to the compressed line. The integrity metadata includes a value that is generated using the compressed line. In one embodiment, the integrity metadata may include an authentication value generated using a block authenticated encryption cipher performed on each block of the compressed line. For example, the computing device 100 may employ an AES/XTS block cipher of 128 bits per block and may diffuse the AES blocks across the line to allow the integrity value to represent the whole cacheline, using a reduced round technique or other diffusion technique. Of course, in some embodiments the computing device 100 may use a wider block cipher such as 3Fish. Additionally or alternatively, in some embodiments the computing device may distribute the integrity value across the cache line so that there is a representative portion of an integrity value in each block. Likewise, the integrity value may be a hash of the contents of the whole plaintext data line (such as a SHA3 hash).

The method 600 advances to block 620, in which the computing device 100 encrypts part of the compressed line with the encryption key to generate an encrypted line. More specifically, at block 622, the computing device 100 encrypts the compression metadata, the compressed data, and the integrity metadata. The computing device 100 leaves the key identifier in the clear.

After generating the encrypted line, the method 600 advances to block 624, in which the computing device 100 writes the encrypted line to a destination memory address specified by the write request. After writing the encrypted line to memory, the method 600 loops back to block 602 to continue monitoring for write requests.

Referring back to block 610, if the data line is not compressible, the method 600 branches to block 626, shown in FIG. 6B. Referring now to FIG. 6B, in block 626 the computing device 100 encrypts the entire data line (which is uncompressed) with the encryption key to generate an encrypted line. At block 628 the computing device 100 selects a test encryption key using the start of the encrypted line as a test key identifier. For example, the computing device 100 may treat the first three bits of the encrypted line as the test key identifier and index the key table with the test key identifier to select the test encryption key. As described further below, the test encryption key is used to test for the unusual scenario in which the first three bits of the encrypted line (which are essentially random) select an encryption key that nevertheless generates valid integrity metadata.

At block 630 the computing device 100 decrypts the remaining part of the encrypted line using the test key identifier to generate a test data line. For example, the computing device 100 may decrypt all of the encrypted line starting after the first three bits. At block 632 the computing device 100 determines whether the integrity metadata of the test data line is valid. The computing device 100 may, for example, treat a particular field of the test data line as an authentication value and another field as compressed data and determine whether the test authentication value is valid for the test compressed data. Of course, those values are generated by decrypting the encrypted line with the wrong encryption key and are thus essentially random; accordingly, the test authentication value will only rarely be valid. At block 634, the computing device 100 checks if the integrity metadata of the test data line is valid. If not, the method 600 branches to block 624, shown in FIG. 6A, to write the encrypted line to memory. If the integrity metadata of the test data line is valid, then the method 600 advances to block 636.

In block 636 the computing device 100 sets the start of the encrypted line to be a conflict indicator. The conflict indicator may be embodied as a predetermined binary value of the same length as a key identifier (e.g., three bits). The conflict identifier may not be used as a valid key identifier value. Additionally, at block 638, the computing device 100 updates a conflict table 208 to include the original start of the encrypted line (i.e., the starting bits of the encrypted line that were used as the test key identifier). As described further below in connection with FIGS. 8A and 8B, the conflict table 208 may be used to decrypt the encrypted line on read. After updating the conflict table, the method 600 branches to block 624, shown in FIG. 6A, to write the encrypted line to memory.

Figure 7:
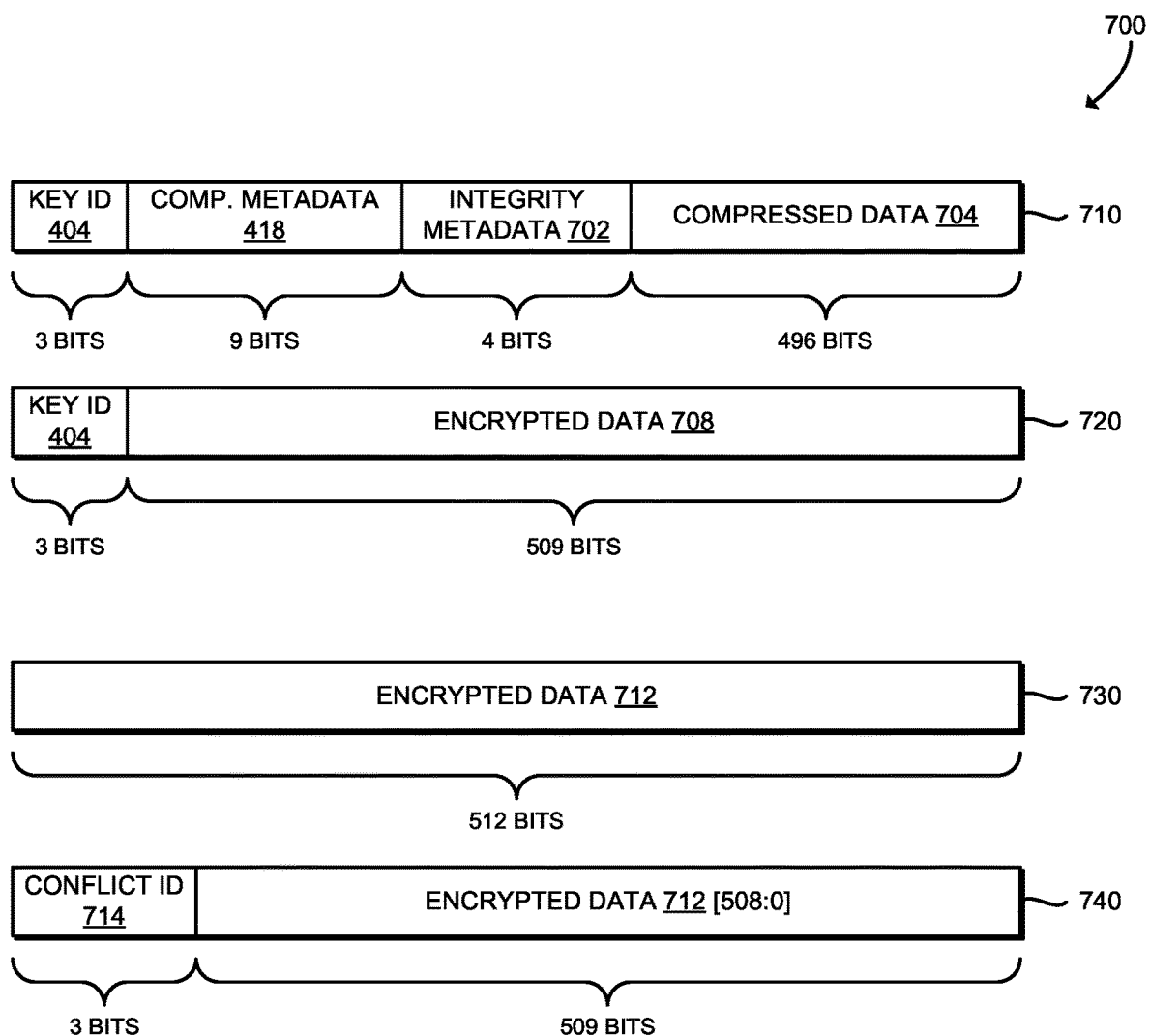
FIG. 7 is a schematic diagram illustrating various memory states that may be generated by the computing device of FIGS. 1 and 2.

Referring now to FIG. 7, a block diagram 700 illustrates a variety of memory states generated as a result of the replay prevention scheme as disclosed herein. Memory block 710 shows a compressed line that may be generated as described above in connection with FIGS. 6A and 6B. As shown, the memory block 710 includes a key identifier 404 (similar to the key identifier 404 shown in FIG. 4), compression metadata 418 (similar to the compression metadata 418 shown in FIG. 4), integrity metadata 702, and compressed data 704. As described above, the integrity metadata 702 may be used to verify the compressed data 704. Memory block 720 shows an encrypted line that may be generated as described above in connection with block 620 of FIG. 6A. As shown, the memory block 720 includes encrypted data 708 and the key identifier 404. As shown in memory block 720, the key identifier 404 is unencrypted.

Memory block 730 shows an encrypted line that may be generated as described above in connection with block 626 of FIG. 6B. As shown, memory block 730 includes encrypted data 712, and the entire data line of 512 bits is encrypted. In contrast, memory block 740 includes encrypted data 712 with a conflict indicator 714 that is unencrypted. The conflict indicator 714 illustratively replaces the first three bits of the encrypted data 712, and therefore the memory block 740 includes the last 509 bits of the encrypted data 712. The memory block 740 may be generated as described above in connection with block 636 of FIG. 6B.

Figure 8A:
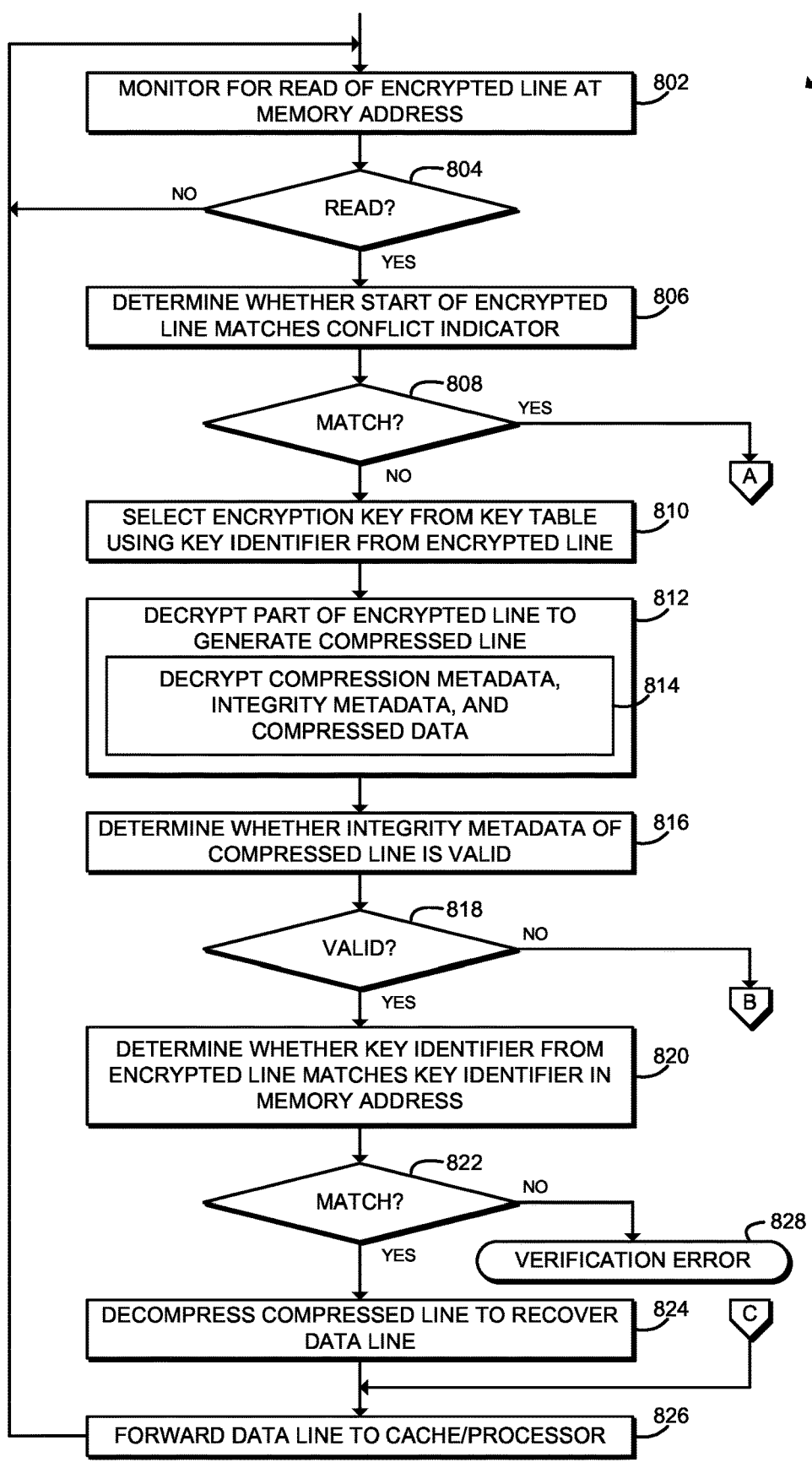
FIGS. 8A and 8B are a simplified flow diagram of at least one embodiment of a method for memory replay prevention using compressive encryption that may be performed by the computing device of FIGS. 1 and 2 to read a data line from memory.

Referring to FIG. 8A, in use, in use, the computing device 100 may execute a method 800 for reading a data line that has been written using compressive replay prevention. The method 800 begins at block 802, in which the computing device 100 monitors for read requests. As described above, a read request may be generated, for example, by a core of the processor 120 in response to executing a load instruction and/or by a caching subsystem of the processor 120. The read request identifies the physical address of the data line, also referred to herein as the source physical address. In block 804, the computing device 100 determines whether a read has been requested. If not, the method 800 loops back to block 802 to continue monitoring for reads. If a read has been requested, the method 800 advances to block 806.

The method advances to block 806, in which the computing device 100 determines whether the start of the encrypted line is a conflict indicator. As described above, the conflict indicator may be embodied as a predetermined binary value of the same length as a key identifier (e.g., three bits). In block 808, the computing device 100 checks whether the start of the encrypted line matches the conflict identifier. If so, the method 800 branches to block 830, shown in FIG. 8B and described below. If the start of the encrypted line does not match the conflict indicator, the method 800 advances to block 810.

At block 810, the computing device 100 selects an encryption key from a key table using the key identifier stored within the encrypted line. As described above, the key identifier may be embodied as one or more bits of the memory address that are reserved or otherwise not used to identify the memory location. The key identifier (e.g., a three-bit value) may be used to index a key table in memory to select the encryption key.

The method 800 then advances to block 812, in which the computing device 100 decrypts part of the encrypted line with the encryption key to generate the compressed line. More specifically, in block 814 the computing device 100 decrypts the compressed data, the integrity metadata, and the compression metadata that was generated as part of the compression process. The computing device 100 does not decrypt the key identifier (which as stored in the clear).

At block 816, the computing device 100 determines whether the integrity metadata of the compressed line is valid. The computing device 100 may, for example, determine whether the integrity metadata is a valid authentication data for the compressed data. The integrity metadata may be invalid, for example, if the original data line was uncompressible, as described above in connection with blocks 626-638 of FIG. 6B. In block 818, the computing device 100 checks whether the integrity metadata is valid. If not, the method 800 branches to block 832, shown in FIG. 8B and described below. If the integrity metadata is found to be valid at block 818, the method 800 advances to block 820.

In block 820, the computing device 100 determines whether the key identifier that was stored with the compressed line matches the key identifier of the memory address used to read the encrypted line. As described above, at write time, the key identifier of the virtual machine that requested the data line to be written was stored with the compressed line, as described above with respect to FIGS. 6A and 6B. Consequently, the stored key identifier is associated with the virtual machine that requested the write. Because the key identifier of the memory address of the read is associated with the virtual machine that requested the read, the computing device 100 may compare the key identifiers to detect replay attempts.

At block 822, the computing device 100 checks whether the key identifier in the encrypted line matches the key identifier in the memory address. If the key identifiers do not match, the method 800 branches to block 828, in which the computing device 100 generates a verification error, for example by sending a poison bit, error bit, or error message to the central processing unit 120. In this circumstance, the key identifiers do not match, but the integrity metadata is valid, meaning that a virtual machine may be attempting to replay an encrypted line generated by a different virtual machine or other protection domain. More specifically, the compression/encryption support block may transmit a poison bit to the central processing unit 120 to indicate that a memory read attempt failed, possibly due to an unauthorized memory replay attempt. The central processing unit 120 is configured to notify an operator, log the memory reply attempt, or take cautionary measures to identify the unauthorized virtual machine and prevent further attempts. After generating the verification error, the method 800 is completed, for example by aborting the read request.

Referring back to block 822, if a match is found between the stored key identifier and the key identifier of the memory address, the method 800 advances to block 824, in which the computing device 100 decompresses the compressed line to recover the data line in uncompressed form. The method 800 continues to block 826, in which the computing device 100 forwards the uncompressed data line to the cache and/or processor 120 (which in turn provides access to the virtual machine that requested the data line). After forwarding the data line, the method 800 loops back to block 802 to continue monitoring for additional read requests.

Figure 8B:
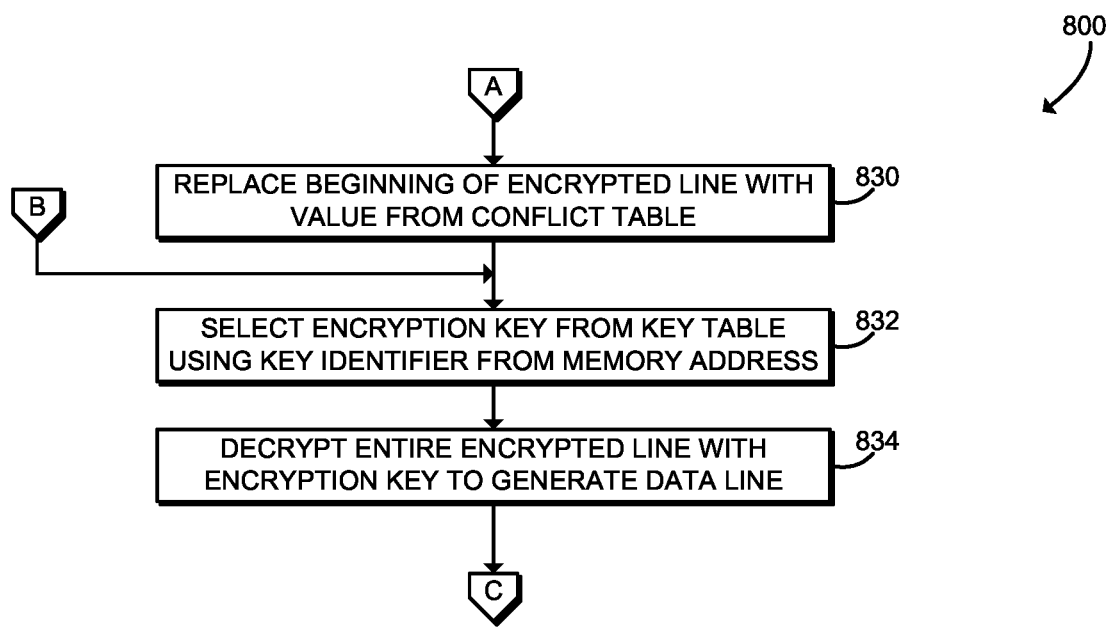

Referring back to block 808, if the start of the encrypted line is found to match the conflict indicator, the method 800 branches to block 830 as shown in FIG. 8B. Referring now to FIG. 8B, in block 830 the computing device 100 replaces the beginning of the encrypted line with a corresponding value from the conflict table 208. As described above in connection with blocks 636, 638 of FIG. 6B, the start of the encrypted line was previously stored in the conflict table 208. The computing device 100 may, for example, index the conflict table 208 with the memory address of the encrypted line to retrieve the original start value.

After replacing the beginning of the encrypted line, the method 800 advances to block 832. Additionally, referring back to block 818 of FIG. 8A, if the integrity metadata of the compressed line was not valid, the method 800 also branches to block 832. In block 832, the computing device 100 selects an encryption key from the key table using the key identifier of the memory address of the requested data line (i.e., the key identifier provided by the virtual machine requesting the read). The method 800 then advances to block 834 in which the computing device 100 decrypts the entire encrypted line with the encryption key to generate the data line. After decryption, the method 800 branches to block 826, shown in FIG. 8A, to forward the data line to the cache.

EXAMPLES

Illustrative examples of the technologies disclosed herein are provided below. An embodiment of the technologies may include any one or more, and any combination of, the examples described below.

Example 1 includes a computing device for memory isolation, the computing device comprising: a memory manager to receive a request to write a data line to a physical memory address, wherein the physical memory address comprises a key identifier; a key manager to select an encryption key from a key table based on the key identifier of the physical memory address; a compression manager to (i) determine whether the data line is compressible, and (ii) compress the data line to generate a compressed line in response to a determination that the data line is compressible, wherein the compressed line comprises compression metadata and compressed data; and an encryption manager to (i) add encryption metadata to the compressed line, wherein the encryption metadata is indicative of the encryption key, and (ii) encrypt a part of the compressed line with the encryption key to generate an encrypted line in response to addition of the encryption metadata; wherein the memory manager is further to write the encrypted line to a memory device at the physical memory address.

Example 2 includes the subject matter of Example 1, and wherein to select the encryption key from the key table comprises to index the key table with the key identifier to retrieve the encryption key.

Example 3 includes the subject matter of any of Examples 1 and 2, and wherein the encryption metadata includes the key identifier.

Example 4 includes the subject matter of any of Examples 1-1, and wherein the encryption metadata includes a hash of the encryption key.

Example 5 includes the subject matter of any of Examples 1-3, and wherein the compression manager is further to add a compression indicator to the compressed line, wherein the compression indicator comprises a predetermined bit pattern.

Example 6 includes the subject matter of any of Examples 1-5, and wherein to encrypt the part of the compressed line comprises to encrypt the compression metadata and the compressed data.

Example 7 includes the subject matter of any of Examples 1-6, and wherein to encrypt the part of the compressed line further comprises to encrypt the encryption metadata.

Example 8 includes the subject matter of any of Examples 1-7, and further comprising a conflict manager to: encrypt the data line with the encryption key to generate the encrypted line in response to a determination that the data line is not compressible; determine whether a start of the encrypted line matches the compression indicator or a conflict indicator in response to encryption of the data line, wherein the conflict indicator comprises a second predetermined bit pattern different from the compression indicator; update an entry of a conflict table that corresponds to the physical memory address based on the start of the encrypted line in response to a determination that the start of the encrypted line matches the compression indicator or the conflict indicator; and replace the start of the encrypted line with the conflict indicator in response to the determination that the start of the encrypted line matches the compression indicator or the conflict indicator; wherein to write the encrypted line further comprises to write the encrypted line in response to replacement of the start of the encrypted line.

Example 9 includes the subject matter of any of Examples 1-8, and wherein: the encryption manager is further to add integrity metadata to the compressed line, wherein the integrity metadata comprises an integrity check value based on the compressed data; the encryption metadata comprises the key identifier; and to encrypt the part of the compressed line comprises to encrypt the compression metadata, the integrity metadata, and the compressed data.

Example 10 includes the subject matter of any of Examples 1-9, and further comprising a conflict manager to: encrypt the data line with the encryption key to generate the encrypted line in response to a determination that the data line is not compressible; select a second encryption key from the key table based on a first part of the encrypted line; decrypt a remaining part of the encrypted line with the second encryption key to generate a test compressed line, wherein the test compressed line comprises second compression metadata, second integrity metadata, and second compressed data; determine whether the second integrity metadata is valid based on the second compressed data; update an entry of a conflict table that corresponds to the physical memory address with the first part of the encrypted line in response to a determination that the second integrity metadata is valid; and replace the first part of the encrypted line with a conflict indicator in response to the determination that the second integrity metadata is valid, wherein the conflict indicator comprises a predetermined bit pattern; wherein to write the encrypted line further comprises to write the encrypted line in response to replacement of the first part of the encrypted line.

Example 11 includes the subject matter of any of Examples 1-10, and wherein to encrypt the part of the compressed line comprises to: encrypt a first block with a block cipher to generate a first encrypted block, wherein the first block starts at an offset in the compressed line; generate a last block, wherein the last block includes a last part of the compressed line and a first part of the first encrypted block; encrypt the last block with the block cipher to generate a last encrypted block, and replace the first part of the first encrypted block with a last part of the last encrypted block.

Example 12 includes a computing device for memory isolation, the computing device comprising: a memory manager to receive a request to read an encrypted line from a physical memory address of the computing device, wherein the physical memory address comprises a key identifier; a key manager to select a decryption key from a key table based on the key identifier of the physical memory address; a compression manager to determine whether a start of the encrypted line matches a compression indicator, wherein the compression indicator comprises a predetermined bit pattern; and an encryption manager to (i) decrypt a part of the encrypted line with the decryption key to generate a compressed line in response to a determination that the start of the encrypted line matches the compression indicator, wherein the compressed line comprises compression metadata, encryption metadata, and compressed data, and (ii) determine whether the encryption metadata is verified against the decryption key; wherein the compression manager is further to decompress the compressed data to generate a data line in response to a determination that the encryption metadata is verified; and wherein the memory manager is further to forward the data line to a processor.

Example 13 includes the subject matter of Example 12, and wherein to select the decryption key from the key table comprises to index the key table with the key identifier to retrieve the decryption key.

Example 14 includes the subject matter of any of Examples 12 and 13, and wherein the encryption metadata includes the key identifier.

Example 15 includes the subject matter of any of Examples 12-14, and wherein the encryption metadata includes a hash of the decryption key.

Example 16 includes the subject matter of any of Examples 12-15, and wherein the encryption manager is further to generate a verification error in response to a determination that the encryption metadata is not verified.

Example 17 includes the subject matter of any of Examples 12-16, and further comprising a conflict manager to: determine whether the start of the encrypted line matches a conflict indicator in response to a determination that the start of the encrypted line does not match the compression indicator, wherein the conflict indicator comprises a predetermined bit pattern different from the compression indicator; and decrypt the entire encrypted line with the decryption key to generate the data line in response to a determination that the start of the encrypted line does not match the conflict indicator.

Example 18 includes the subject matter of any of Examples 12-17, and wherein the conflict manager is further to: replace the start of the encrypted line with the compression indicator based on a value from a conflict table that corresponds to the physical memory address of the encrypted line in response to a determination that the start of the encrypted line matches the conflict indicator; wherein to decrypt the entire encrypted line further comprises to decrypt the entire encrypted line in response to replacement of the start of the encrypted line.

Example 19 includes a computing device for memory isolation, the computing device comprising: a memory manager to receive a request to read an encrypted line from a physical memory address of the computing device, wherein the physical memory address comprises a key identifier; a conflict manager to determine whether a start of the encrypted line matches a conflict indicator, wherein the conflict indicator comprises a predetermined bit pattern; a key manager to select a decryption key from a key table based on the start of the encrypted line in response to a determination that the start of the encrypted line does not match the conflict indicator; an encryption manager to (i) decrypt a part of the encrypted line with the decryption key to generate a compressed line, wherein the compressed line comprises compression metadata, integrity metadata, and compressed data, and (ii) determine whether the integrity metadata is verified against the compressed data; and a compression manager to decompress the compressed data to generate a data line in response to a determination that the integrity metadata is verified against the compressed data; wherein the memory manager is further to forward the data line to the processor.

Example 20 includes the subject matter of Example 19, and wherein the encryption manager is further to: determine whether the start of the encrypted line matches the key identifier of the physical memory address in response to the determination that the integrity metadata is verified against the compressed data; and generate a verification error in response to a determination that the start of the encrypted line does not match the key identifier of the physical memory address; wherein to decompress the compressed data further comprises to decompress the compressed data in response to a determination that the start of the encrypted line matches the key identifier of the physical memory address.

Example 21 includes the subject matter of any of Examples 19 and 20, and wherein the conflict manager is further to: select a second decryption key from the key table based on the key identifier of the physical memory address in response to a determination that the integrity metadata is not verified against the compressed data; and decrypt the entire encrypted line with the second decryption key to generate the data line in response to selection of the second decryption key; wherein to forward the data line further comprises to forward the data line in response to decryption of the entire encrypted line.

Example 22 includes the subject matter of any of Examples 19-21, and wherein the conflict manager is further to: replace the start of the encrypted line with a value from a conflict table that corresponds to the physical memory address of the encrypted line in response to a determination that the start of the encrypted line matches the conflict indicator; wherein to decrypt the entire encrypted line further comprises to decrypt the entire encrypted line in response to replacement of the start of the encrypted line.

Example 23 includes a method for memory isolation, the method comprising: receiving, by a computing device, a request to write a data line to a physical memory address, wherein the physical memory address comprises a key identifier; selecting, by the computing device, an encryption key from a key table based on the key identifier of the physical memory address; determining, by the computing device, whether the data line is compressible; compressing, by the computing device, the data line to generate a compressed line in response to determining that the data line is compressible, wherein the compressed line comprises compression metadata and compressed data; adding, by the computing device, encryption metadata to the compressed line, wherein the encryption metadata is indicative of the encryption key; encrypting, by the computing device, a part of the compressed line with the encryption key to generate an encrypted line in response to adding the encryption metadata; and writing, by the computing device, the encrypted line to a memory device at the physical memory address.

Example 24 includes the subject matter of Example 23, and wherein selecting the encryption key from the key table comprises indexing the key table with the key identifier to retrieve the encryption key.

Example 25 includes the subject matter of any of Examples 23 and 24, and wherein the encryption metadata includes the key identifier.

Example 26 includes the subject matter of any of Examples 23-25, and wherein the encryption metadata includes a hash of the encryption key.

Example 27 includes the subject matter of any of Examples 23-26, and further comprising adding, by the computing device, a compression indicator to the compressed line, wherein the compression indicator comprises a predetermined bit pattern.

Example 28 includes the subject matter of any of Examples 23-27, and wherein encrypting the part of the compressed line comprises encrypting the compression metadata and the compressed data.

Example 29 includes the subject matter of any of Examples 23-28, and wherein encrypting the part of the compressed line further comprises encrypting the encryption metadata.

Example 30 includes the subject matter of any of Examples 23-29, and further comprising: encrypting, by the computing device, the data line with the encryption key to generate the encrypted line in response to determining that the data line is not compressible; determining, by the computing device, whether a start of the encrypted line matches the compression indicator or a conflict indicator in response to encrypting the data line, wherein the conflict indicator comprises a second predetermined bit pattern different from the compression indicator; updating, by the computing device, an entry of a conflict table that corresponds to the physical memory address based on the start of the encrypted line in response to determining that the start of the encrypted line matches the compression indicator or the conflict indicator; and replacing, by the computing device, the start of the encrypted line with the conflict indicator in response to determining that the start of the encrypted line matches the compression indicator or the conflict indicator; wherein writing the encrypted line further comprises writing the encrypted line in response to replacing the start of the encrypted line.

Example 31 includes the subject matter of any of Examples 23-30, and further comprising: adding, by the computing device, integrity metadata to the compressed line, wherein the integrity metadata comprises an integrity check value based on the compressed data; wherein the encryption metadata comprises the key identifier; and wherein encrypting the part of the compressed line comprises encrypting the compression metadata, the integrity metadata, and the compressed data.

Example 32 includes the subject matter of any of Examples 23-31, and further comprising: encrypting, by the computing device, the data line with the encryption key to generate the encrypted line in response to determining that the data line is not compressible; selecting, by the computing device, a second encryption key from the key table based on a first part of the encrypted line; decrypting, by the computing device, a remaining part of the encrypted line with the second encryption key to generate a test compressed line, wherein the test compressed line comprises second compression metadata, second integrity metadata, and second compressed data; determining, by the computing device, whether the second integrity metadata is valid based on the second compressed data; updating, by the computing device, an entry of a conflict table that corresponds to the physical memory address with the first part of the encrypted line in response to determining that the second integrity metadata is valid; and replacing, by the computing device, the first part of the encrypted line with a conflict indicator in response to determining that the second integrity metadata is valid, wherein the conflict indicator comprises a predetermined bit pattern; wherein writing the encrypted line further comprises writing the encrypted line in response to replacing the first part of the encrypted line.

Example 33 includes the subject matter of any of Examples 23-32, and wherein encrypting the part of the compressed line comprises: encrypting a first block with a block cipher to generate a first encrypted block, wherein the first block starts at an offset in the compressed line; generating a last block, wherein the last block includes a last part of the compressed line and a first part of the first encrypted block; encrypting the last block with the block cipher to generate a last encrypted block, and replacing the first part of the first encrypted block with a last part of the last encrypted block.

Example 34 includes a method for memory isolation, the method comprising: receiving, by a computing device, a request to read an encrypted line from a physical memory address of the computing device, wherein the physical memory address comprises a key identifier; selecting, by the computing device, a decryption key from a key table based on the key identifier of the physical memory address; determining, by the computing device, whether a start of the encrypted line matches a compression indicator, wherein the compression indicator comprises a predetermined bit pattern; decrypting, by the computing device, a part of the encrypted line with the decryption key to generate a compressed line in response to determining that the start of the encrypted line matches the compression indicator, wherein the compressed line comprises compression metadata, encryption metadata, and compressed data; determining, by the computing device, whether the encryption metadata is verified against the decryption key; decompressing, by the computing device, the compressed data to generate a data line in response to determining that the encryption metadata is verified; and forwarding, by the computing device, the data line to a processor.

Example 35 includes the subject matter of Example 34, and wherein selecting the decryption key from the key table comprises indexing the key table with the key identifier to retrieve the decryption key.

Example 36 includes the subject matter of any of Examples 34 and 35, and wherein the encryption metadata includes the key identifier.

Example 37 includes the subject matter of any of Examples 34-36, and wherein the encryption metadata includes a hash of the decryption key.

Example 38 includes the subject matter of any of Examples 34-37, and further comprising generating, by the computing device, a verification error in response to determining that the encryption metadata is not verified.

Example 39 includes the subject matter of any of Examples 34-38, and further comprising: determining, by the computing device, whether the start of the encrypted line matches a conflict indicator in response to determining that the start of the encrypted line does not match the compression indicator, wherein the conflict indicator comprises a predetermined bit pattern different from the compression indicator; and decrypting the entire encrypted line with the decryption key to generate the data line in response to determining that the start of the encrypted line does not match the conflict indicator.

Example 40 includes the subject matter of any of Examples 34-39, and further comprising: replacing, by the computing device, the start of the encrypted line with the compression indicator based on a value from a conflict table that corresponds to the physical memory address of the encrypted line in response to determining that the start of the encrypted line matches the conflict indicator; wherein decrypting the entire encrypted line further comprises decrypting the entire encrypted line in response to replacing the start of the encrypted line.

Example 41 includes a method for memory isolation, the method comprising: receiving, by a computing device, a request to read an encrypted line from a physical memory address of the computing device, wherein the physical memory address comprises a key identifier; determining, by the computing device, whether a start of the encrypted line matches a conflict indicator, wherein the conflict indicator comprises a predetermined bit pattern; selecting, by the computing device, a decryption key from a key table based on the start of the encrypted line in response to determining that the start of the encrypted line does not match the conflict indicator; decrypting, by the computing device, a part of the encrypted line with the decryption key to generate a compressed line, wherein the compressed line comprises compression metadata, integrity metadata, and compressed data; determining, by the computing device, whether the integrity metadata is verified against the compressed data; decompressing, by the computing device, the compressed data to generate a data line in response to determining that the integrity metadata is verified against the compressed data; and forwarding, by the computing device, the data line to the processor.

Example 42 includes the subject matter of Example 41, and further comprising: determining, by the computing device, whether the start of the encrypted line matches the key identifier of the physical memory address in response to determining that the integrity metadata is verified against the compressed data; and generating, by the computing device, a verification error in response to determining that the start of the encrypted line does not match the key identifier of the physical memory address; wherein decompressing the compressed data further comprises decompressing the compressed data in response to determining that the start of the encrypted line matches the key identifier of the physical memory address.

Example 43 includes the subject matter of any of Examples 41 and 42, and further comprising: selecting, by the computing device, a second decryption key from the key table based on the key identifier of the physical memory address in response to determining that the integrity metadata is not verified against the compressed data; and decrypting the entire encrypted line with the second decryption key to generate the data line in response to selecting the second decryption key; wherein forwarding the data line further comprises forwarding the data line in response to decrypting the entire encrypted line.

Example 44 includes the subject matter of any of Examples 41-43, and further comprising: replacing, by the computing device, the start of the encrypted line with a value from a conflict table that corresponds to the physical memory address of the encrypted line in response to determining that the start of the encrypted line matches the conflict indicator; wherein decrypting the entire encrypted line further comprises decrypting the entire encrypted line in response to replacing the start of the encrypted line.

Example 45 includes a computing device comprising: a processor; and a memory having stored therein a plurality of instructions that when executed by the processor cause the computing device to perform the method of any of Examples 22-44.

Example 46 includes one or more machine readable storage media comprising a plurality of instructions stored thereon that in response to being executed result in a computing device performing the method of any of Examples 22-44.

Example 47 includes a computing device comprising means for performing the method of any of Examples 22-44.

Example 48 includes a computing device for memory isolation, the computing device comprising: means for receiving a request to write a data line to a physical memory address, wherein the physical memory address comprises a key identifier; means for selecting an encryption key from a key table based on the key identifier of the physical memory address; means for determining whether the data line is compressible; means for compressing the data line to generate a compressed line in response to determining that the data line is compressible, wherein the compressed line comprises compression metadata and compressed data; means for adding encryption metadata to the compressed line, wherein the encryption metadata is indicative of the encryption key; means for encrypting a part of the compressed line with the encryption key to generate an encrypted line in response to adding the encryption metadata; and means for writing the encrypted line to a memory device at the physical memory address.

Example 49 includes the subject matter of Example 48, and wherein the means for selecting the encryption key from the key table comprises means for indexing the key table with the key identifier to retrieve the encryption key.

Example 50 includes the subject matter of any of Examples 48 and 49, and wherein the encryption metadata includes the key identifier.

Example 51 includes the subject matter of any of Examples 48-50, and wherein the encryption metadata includes a hash of the encryption key.

Example 52 includes the subject matter of any of Examples 48-51, and further comprising means for adding a compression indicator to the compressed line, wherein the compression indicator comprises a predetermined bit pattern.

Example 53 includes the subject matter of any of Examples 48-52, and wherein the means for encrypting the part of the compressed line comprises means for encrypting the compression metadata and the compressed data.

Example 54 includes the subject matter of any of Examples 48-53, and wherein the means for encrypting the part of the compressed line further comprises means for encrypting the encryption metadata.

Example 55 includes the subject matter of any of Examples 48-54, and further comprising: means for encrypting the data line with the encryption key to generate the encrypted line in response to determining that the data line is not compressible; means for determining whether a start of the encrypted line matches the compression indicator or a conflict indicator in response to encrypting the data line, wherein the conflict indicator comprises a second predetermined bit pattern different from the compression indicator; means for updating an entry of a conflict table that corresponds to the physical memory address based on the start of the encrypted line in response to determining that the start of the encrypted line matches the compression indicator or the conflict indicator; and means for replacing the start of the encrypted line with the conflict indicator in response to determining that the start of the encrypted line matches the compression indicator or the conflict indicator; wherein the means for writing the encrypted line further comprises means for writing the encrypted line in response to replacing the start of the encrypted line.

Example 56 includes the subject matter of any of Examples 48-55, and further comprising: means for adding integrity metadata to the compressed line, wherein the integrity metadata comprises an integrity check value based on the compressed data; wherein the encryption metadata comprises the key identifier; and wherein the means for encrypting the part of the compressed line comprises means for encrypting the compression metadata, the integrity metadata, and the compressed data.

Example 57 includes the subject matter of any of Examples 48-56, and further comprising: means for encrypting the data line with the encryption key to generate the encrypted line in response to determining that the data line is not compressible; means for selecting a second encryption key from the key table based on a first part of the encrypted line; means for decrypting a remaining part of the encrypted line with the second encryption key to generate a test compressed line, wherein the test compressed line comprises second compression metadata, second integrity metadata, and second compressed data; means for determining whether the second integrity metadata is valid based on the second compressed data; means for updating an entry of a conflict table that corresponds to the physical memory address with the first part of the encrypted line in response to determining that the second integrity metadata is valid; and means for replacing the first part of the encrypted line with a conflict indicator in response to determining that the second integrity metadata is valid, wherein the conflict indicator comprises a predetermined bit pattern; wherein the means for writing the encrypted line further comprises means for writing the encrypted line in response to replacing the first part of the encrypted line.

Example 58 includes the subject matter of any of Examples 48-57, and wherein encrypting the part of the compressed line comprises: means for encrypting a first block with a block cipher to generate a first encrypted block, wherein the first block starts at an offset in the compressed line; means for generating a last block, wherein the last block includes a last part of the compressed line and a first part of the first encrypted block; means for encrypting the last block with the block cipher to generate a last encrypted block, and means for replacing the first part of the first encrypted block with a last part of the last encrypted block.

Example 59 includes a computing device for memory isolation, the computing device comprising: means for receiving a request to read an encrypted line from a physical memory address of the computing device, wherein the physical memory address comprises a key identifier; means for selecting a decryption key from a key table based on the key identifier of the physical memory address; means for determining whether a start of the encrypted line matches a compression indicator, wherein the compression indicator comprises a predetermined bit pattern; means for decrypting a part of the encrypted line with the decryption key to generate a compressed line in response to determining that the start of the encrypted line matches the compression indicator, wherein the compressed line comprises compression metadata, encryption metadata, and compressed data; means for determining whether the encryption metadata is verified against the decryption key; means for decompressing the compressed data to generate a data line in response to determining that the encryption metadata is verified; and means for forwarding the data line to a processor.

Example 60 includes the subject matter of Example 59, and wherein the means for selecting the decryption key from the key table comprises means for indexing the key table with the key identifier to retrieve the decryption key.

Example 61 includes the subject matter of any of Examples 59 and 60, and wherein the encryption metadata includes the key identifier.

Example 62 includes the subject matter of any of Examples 59-61, and wherein the encryption metadata includes a hash of the decryption key.

Example 63 includes the subject matter of any of Examples 59-62, and further comprising means for generating a verification error in response to determining that the encryption metadata is not verified.

Example 64 includes the subject matter of any of Examples 59-63, and further comprising: means for determining whether the start of the encrypted line matches a conflict indicator in response to determining that the start of the encrypted line does not match the compression indicator, wherein the conflict indicator comprises a predetermined bit pattern different from the compression indicator; and means for decrypting the entire encrypted line with the decryption key to generate the data line in response to determining that the start of the encrypted line does not match the conflict indicator.

Example 65 includes the subject matter of any of Examples 59-64, and further comprising: means for replacing the start of the encrypted line with the compression indicator based on a value from a conflict table that corresponds to the physical memory address of the encrypted line in response to determining that the start of the encrypted line matches the conflict indicator; wherein the means for decrypting the entire encrypted line further comprises means for decrypting the entire encrypted line in response to replacing the start of the encrypted line.

Example 66 includes a computing device for memory isolation, the computing device comprising: means for receiving a request to read an encrypted line from a physical memory address of the computing device, wherein the physical memory address comprises a key identifier; means for determining whether a start of the encrypted line matches a conflict indicator, wherein the conflict indicator comprises a predetermined bit pattern; means for selecting a decryption key from a key table based on the start of the encrypted line in response to determining that the start of the encrypted line does not match the conflict indicator; means for decrypting a part of the encrypted line with the decryption key to generate a compressed line, wherein the compressed line comprises compression metadata, integrity metadata, and compressed data; means for determining whether the integrity metadata is verified against the compressed data; means for decompressing the compressed data to generate a data line in response to determining that the integrity metadata is verified against the compressed data; and means for forwarding the data line to the processor.

Example 67 includes the subject matter of Example 66, and further comprising: means for determining whether the start of the encrypted line matches the key identifier of the physical memory address in response to determining that the integrity metadata is verified against the compressed data; and means for generating a verification error in response to determining that the start of the encrypted line does not match the key identifier of the physical memory address; wherein the means for decompressing the compressed data further comprises means for decompressing the compressed data in response to determining that the start of the encrypted line matches the key identifier of the physical memory address.

Example 68 includes the subject matter of any of Examples 66 and 67, and further comprising: means for selecting a second decryption key from the key table based on the key identifier of the physical memory address in response to determining that the integrity metadata is not verified against the compressed data; and means for decrypting the entire encrypted line with the second decryption key to generate the data line in response to selecting the second decryption key; wherein the means for forwarding the data line further comprises means for forwarding the data line in response to decrypting the entire encrypted line.

Example 69 includes the subject matter of any of Examples 66-68, and further comprising: means for replacing the start of the encrypted line with a value from a conflict table that corresponds to the physical memory address of the encrypted line in response to determining that the start of the encrypted line matches the conflict indicator; wherein the means for decrypting the entire encrypted line further comprises means for decrypting the entire encrypted line in response to replacing the start of the encrypted line.

The invention claimed is:

1. A computing device comprising:
    processing circuitry coupled to a memory, the processing circuitry to:
    select an encryption key from a key table based on a key identifier associated with a physical memory address, wherein the key table is indexed with the key identifier to retrieve the encryption key; and
    add encryption metadata to a compressed line, wherein the encryption metadata is indicative of the encryption key, and encrypt a part of the compressed line based on the encryption key to generate an encrypted line in response to addition of the encryption metadata, wherein the encrypted line is written to a memory device associated with the physical memory address.

2. The computing device of claim 1, wherein the processing circuitry is further to:
    receive a request to write a data line to the physical memory address, wherein the physical memory address comprises the key identifier; and
    determine whether the data line is compressible, and compress the data line to generate the compressed line if the data line is compressible, wherein the compressed line comprises compressed data and compressed metadata, wherein the processing circuitry is further to add a compression indicator to the compressed line, wherein the compression indicator comprises a predetermined bit pattern.

3. The computing device of claim 1, wherein the encryption metadata includes the key identifier or a hash of the encryption key, wherein to encrypt the part of the compressed line comprises to encrypt one or more parts of the compressed data or the compression metadata of the compressed line, and wherein to encrypt the part of the compressed line further comprises to encrypt one or more parts of the encryption metadata.

4. The computing device of claim 1, wherein the processing circuitry is further to:
    encrypt the data line based on the encryption key to generate the encrypted line if the data line is not compressible;
    determine whether a start of the encrypted line matches the compression indicator or a conflict indicator in response to encryption of the data line, wherein the conflict indicator comprises a second predetermined bit pattern that is different from the compression indicator;
    update an entry of a conflict table that corresponds to the physical memory address based on the start of the encrypted line if the start of the encrypted line matches the compression indicator or the conflict indicator; and
    replace the start of the encrypted line with the conflict indicator if the start of the encrypted line matches the compression indicator or the conflict indicator, wherein to write the encrypted line further comprises to write the encrypted line in response to replacement of the start of the encrypted line.

5. The computing device of claim 1, wherein the processing circuitry is further to add integrity metadata to the compressed line, wherein the integrity metadata comprises an integrity check value based on the compressed data, wherein the encryption metadata comprises the key identifier, and wherein to encrypt the part of the compressed line comprises to encrypt one or more parts of the compression metadata, the integrity metadata, or the compressed data.

6. The computing device of claim 4, wherein the processing circuitry is further to:
encrypt the data line with the encryption key to generate the encrypted line if the data line is not compressible;
select a second encryption key from the key table based on a first part of the encrypted line;
decrypt a remaining part of the encrypted line with the second encryption key to generate a test compressed line, wherein the test compressed line comprises one or more of second compression metadata, second integrity metadata, or second compressed data;
determine whether the second integrity metadata is valid based on the second compressed data;
update an entry of a conflict table that corresponds to the physical memory address with the first part of the encrypted line if the second integrity metadata is valid; and
replace the first part of the encrypted line with a conflict indicator in response to the determination that the second integrity metadata is valid, wherein the conflict indicator comprises a predetermined bit pattern, wherein to write the encrypted line further comprises to write the encrypted line in response to replacement of the first part of the encrypted line.

7. The computing device of claim 1, wherein to encrypt the part of the compressed line comprises to:
encrypt a first block with a block cipher to generate a first encrypted block, wherein the first block starts at an offset in the compressed line;
generate a last block, wherein the last block includes a last part of the compressed line and a first part of the first encrypted block;
encrypt the last block with the block cipher to generate a last encrypted block, and
replace the first part of the first encrypted block with a last part of the last encrypted block,
wherein the processing circuitry comprises one or more of application processing circuitry or graphics processing circuitry.

8. A method comprising:
selecting, by processing circuitry of a computing device, an encryption key from a key table based on a key identifier associated with a physical memory address, wherein the key table is indexed with the key identifier to retrieve the encryption key; and
adding encryption metadata to a compressed line, wherein the encryption metadata is indicative of the encryption key, and encrypting a part of the compressed line based on the encryption key to generate an encrypted line in response to addition of the encryption metadata, wherein the encrypted line is written to a memory device associated with the physical memory address.

9. The method of claim 8, further comprising:
receiving a request to write a data line to the physical memory address, wherein the physical memory address comprises the key identifier; and
determining whether the data line is compressible, and compressing the data line to generate the compressed line if the data line is compressible, wherein the compressed line comprises compressed data and compressed metadata, wherein compressing the data line includes adding a compression indicator to the compressed line, wherein the compression indicator comprises a predetermined bit pattern.

10. The method of claim 8, wherein the encryption metadata includes the key identifier or a hash of the encryption key, wherein encrypting the part of the compressed line comprises encrypting one or more parts of the compressed data or the compression metadata of the compressed line, and wherein encrypting the part of the compressed line further comprises encrypting one or more parts of the encryption metadata.

11. The method of claim 8, further comprising:
encrypting the data line based on the encryption key to generate the encrypted line if the data line is not compressible;
determining whether a start of the encrypted line matches the compression indicator or a conflict indicator in response to encryption of the data line, wherein the conflict indicator comprises a second predetermined bit pattern that is different from the compression indicator;
updating an entry of a conflict table that corresponds to the physical memory address based on the start of the encrypted line if the start of the encrypted line matches the compression indicator or the conflict indicator; and
replacing the start of the encrypted line with the conflict indicator if the start of the encrypted line matches the compression indicator or the conflict indicator, wherein writing the encrypted line further comprises writing the encrypted line in response to replacement of the start of the encrypted line.

12. The method of claim 8, further comprising adding integrity metadata to the compressed line, wherein the integrity metadata comprises an integrity check value based on the compressed data, wherein the encryption metadata comprises the key identifier, and wherein encrypting the part of the compressed line comprises encrypting one or more parts of the compression metadata, the integrity metadata, or the compressed data.

13. The method of claim 11, further comprising:
encrypting the data line with the encryption key to generate the encrypted line if the data line is not compressible;
selecting a second encryption key from the key table based on a first part of the encrypted line;
decrypting a remaining part of the encrypted line with the second encryption key to generate a test compressed line, wherein the test compressed line comprises one or more of second compression metadata, second integrity metadata, or second compressed data;
determining whether the second integrity metadata is valid based on the second compressed data;
updating an entry of a conflict table that corresponds to the physical memory address with the first part of the encrypted line if the second integrity metadata is valid; and
replacing the first part of the encrypted line with a conflict indicator in response to the determination that the second integrity metadata is valid, wherein the conflict indicator comprises a predetermined bit pattern, wherein writing the encrypted line further comprises writing the encrypted line in response to replacement of the first part of the encrypted line.

14. The method of claim 8, wherein encrypting the part of the compressed line comprises:
encrypting a first block with a block cipher to generate a first encrypted block, wherein the first block starts at an offset in the compressed line;

generating a last block, wherein the last block includes a last part of the compressed line and a first part of the first encrypted block;

encrypting the last block with the block cipher to generate a last encrypted block, and replacing the first part of the first encrypted block with a last part of the last encrypted block, wherein the processing circuitry is coupled to a memory, the processing circuitry comprising one or more of application processing circuitry or graphics processing circuitry.

15. At least one non-transitory computer-readable medium having stored thereon instructions which, when executed, cause a computing device to perform operations comprising:

selecting an encryption key from a key table based on a key identifier associated with a physical memory address, wherein the key table is indexed with the key identifier to retrieve the encryption key; and adding encryption metadata to a compressed line, wherein the encryption metadata is indicative of the encryption key, and encrypting a part of the compressed line based on the encryption key to generate an encrypted line in response to addition of the encryption metadata, wherein the encrypted line is written to a memory device associated with the physical memory address.

16. The non-transitory computer-readable medium of claim 15, wherein the operations further comprise:

receiving a request to write a data line to the physical memory address, wherein the physical memory address comprises the key identifier; and determining whether the data line is compressible, and compressing the data line to generate the compressed line if the data line is compressible, wherein the compressed line comprises compressed data and compressed metadata, wherein compressing the data line includes adding a compression indicator to the compressed line, wherein the compression indicator comprises a predetermined bit pattern.

17. The non-transitory computer-readable medium of claim 15, wherein the encryption metadata includes the key identifier or a hash of the encryption key, wherein encrypting the part of the compressed line comprises encrypting one or more parts of the compressed data or the compression metadata of the compressed line, and wherein encrypting the part of the compressed line further comprises encrypting one or more parts of the encryption metadata.

18. The non-transitory computer-readable medium of claim 15, wherein the operations further comprise:

encrypting the data line based on the encryption key to generate the encrypted line if the data line is not compressible;

determining whether a start of the encrypted line matches the compression indicator or a conflict indicator in response to encryption of the data line, wherein the conflict indicator comprises a second predetermined bit pattern that is different from the compression indicator;

updating an entry of a conflict table that corresponds to the physical memory address based on the start of the encrypted line if the start of the encrypted line matches the compression indicator or the conflict indicator; and replacing the start of the encrypted line with the conflict indicator if the start of the encrypted line matches the compression indicator or the conflict indicator, wherein writing the encrypted line further comprises writing the encrypted line in response to replacement of the start of the encrypted line.

19. The non-transitory computer-readable medium of claim 15, wherein the operations further comprise, further comprising adding integrity metadata to the compressed line, wherein the integrity metadata comprises an integrity check value based on the compressed data, wherein the encryption metadata comprises the key identifier, and wherein encrypting the part of the compressed line comprises encrypting one or more parts of the compression metadata, the integrity metadata, or the compressed data.

20. The non-transitory computer-readable medium of claim 19, wherein the operations further comprise:

encrypting the data line with the encryption key to generate the encrypted line if the data line is not compressible;

selecting a second encryption key from the key table based on a first part of the encrypted line;

decrypting a remaining part of the encrypted line with the second encryption key to generate a test compressed line, wherein the test compressed line comprises one or more of second compression metadata, second integrity metadata, or second compressed data;

determining whether the second integrity metadata is valid based on the second compressed data;

updating an entry of a conflict table that corresponds to the physical memory address with the first part of the encrypted line if the second integrity metadata is valid; and replacing the first part of the encrypted line with a conflict indicator in response to the determination that the second integrity metadata is valid, wherein the conflict indicator comprises a predetermined bit pattern, wherein writing the encrypted line further comprises writing the encrypted line in response to replacing the first part of the encrypted line wherein encrypting the part of the compressed line comprises:

encrypting a first block with a block cipher to generate a first encrypted block, wherein the first block starts at an offset in the compressed line;

generating a last block, wherein the last block includes a last part of the compressed line and a first part of the first encrypted block;

encrypting the last block with the block cipher to generate a last encrypted block, and replacing the first part of the first encrypted block with a last part of the last encrypted block, wherein the computing device comprises processing circuitry coupled to a memory, the processing circuitry having one or more of application processing circuitry or graphics processing circuitry.

* * * * *